US012720096B2

(12) United States Patent
Itsumi et al.

(10) Patent No.: US 12,720,096 B2
(45) Date of Patent: Aug. 25, 2026

(54) IMAGE PROCESSING DEVICE, IMAGE DISPLAY SYSTEM, IMAGE PROCESSING METHOD, AND RECORDING MEDIUM

(71) Applicant: NEC Corporation, Tokyo (JP)

(72) Inventors: Hayato Itsumi, Tokyo (JP); Koichi Nihei, Tokyo (JP); Takanori Iwai, Tokyo (JP); Yusuke Shinohara, Tokyo (JP); Florian Beye, Tokyo (JP); Charvi Vitthal, Tokyo (JP)

(73) Assignee: NEC CORPORATION, Tokyo (JP)

( * ) Notice: Subject to any disclaimer, the term of this patent is extended or adjusted under 35 U.S.C. 154(b) by 277 days.

(21) Appl. No.: 18/277,553

(22) PCT Filed: Feb. 24, 2021

(86) PCT No.: PCT/JP2021/006868

§ 371 (c)(1),
(2) Date: Aug. 16, 2023

(87) PCT Pub. No.: WO2022/180684

PCT Pub. Date: Sep. 1, 2022

(65) Prior Publication Data

US 2024/0129514 A1 Apr. 18, 2024

(51) Int. Cl.
*H04N 19/17* (2014.01)
*G06T 7/00* (2017.01)
(Continued)

(52) U.S. Cl.
CPC ......... *H04N 19/463* (2014.11); *G06T 7/0002* (2013.01); *H04N 19/17* (2014.11);
(Continued)

(58) Field of Classification Search
CPC ...... H04N 19/463; H04N 19/42; H04N 19/48; H04N 19/14; H04N 19/167; G06T 2207/20021
See application file for complete search history.

(56) References Cited

U.S. PATENT DOCUMENTS 6,704,434 B1 3/2004 Sakoh et al.
2016/0057432 A1 2/2016 Shibayama et al.
(Continued)

FOREIGN PATENT DOCUMENTS

CN 111918066 A * 11/2020 ........... H04N 19/124
JP 2004-363974 A 12/2004
(Continued)

OTHER PUBLICATIONS

CN-111918066-A—english translation (Year: 2020).*
(Continued)

*Primary Examiner* — Sumati Lefkowitz
*Assistant Examiner* — Aaron Joseph Sorrin
(74) *Attorney, Agent, or Firm* — Sughrue Mion, PLLC

(57) ABSTRACT

An image processing apparatus which makes it possible to, during remote control, carry out suitable monitoring while suitably suppressing a transmission load. An image processing apparatus includes: an obtaining process for obtaining an image which has been captured from a movable body; an importance level estimating process for estimating levels of importance with respect to a respective plurality of regions included in the image; and a quality parameter determining process for determining quality parameters with respect to the respective plurality of regions with reference to the levels of importance.

4 Claims, 13 Drawing Sheets

(51) Int. Cl.

| | |
|---|---|
| ***H04N 19/42*** | (2014.01) |
| ***H04N 19/463*** | (2014.01) |
| ***H04N 19/48*** | (2014.01) |
| *H04N 7/18* | (2006.01) |

(52) U.S. Cl.

CPC ............. *H04N 19/42* (2014.11); *H04N 19/48* (2014.11); *G06T 2207/20081* (2013.01); *G06T 2207/30168* (2013.01); *H04N 7/183* (2013.01)

(56) References Cited

U.S. PATENT DOCUMENTS

| | | | | |
|---|---|---|---|---|
| 2017/0142424 | A1* | 5/2017 | Jun | H04N 19/184 |
| 2018/0192058 | A1 | 7/2018 | Chen et al. | |
| 2019/0069033 | A1* | 2/2019 | Jun | H04N 19/162 |
| 2019/0191128 | A1 | 6/2019 | Yamagaki et al. | |
| 2022/0321873 | A1 | 10/2022 | Sugano et al. | |

FOREIGN PATENT DOCUMENTS

| | | | | |
|---|---|---|---|---|
| JP | 2007-235705 | A | 9/2007 | |
| JP | 2009-253581 | A | 10/2009 | |
| JP | 2016-046707 | A | 4/2016 | |
| JP | 2017-228949 | A | 12/2017 | |
| JP | WO2018/037890 | A1 | 6/2019 | |
| JP | 2020-188368 | A | 11/2020 | |
| WO | 2018/125579 | A1 | 7/2018 | |
| WO | WO-2019049548 | A1 * | 3/2019 | H04N 19/119 |

OTHER PUBLICATIONS

WO-2019049548-A1—english translation (Year: 2019).*

W. Chu, Y. Liu, C. Shen, D. Cai and X.-S. Hua, "Multi-Task Vehicle Detection With Region-of-Interest Voting," in IEEE Transactions on Image Processing, vol. 27, No. 1, pp. 432-441, Jan. 2018, doi: 10.1109/TIP.2017.2762591. (Year: 2018).*

International Search Report for PCT Application No. PCT/JP2021/006868, mailed on May 11, 2021.

* cited by examiner

START
S100a
S102
Obtain image
S104
Estimate levels of importance
S106
Determine quality parameters
S110
Transmit encoded data
END
START
S200a
S202
Receive encoded data
S206
Display image
END S100b

START

S102b Obtain image

S104b Estimate levels of importance

S105b Estimate quality parameters

S106b Determine quality parameters

S108b Encode image

S110b Transmit encoded data

END

S200b

START

S202b Receive encoded data

S204b Decode encoded data

S206b Display image

END

702

| | | | | | |
|---|---|---|---|---|---|
| 0.1 | 0.1 | 0.1 | 0.1 | 0.1 | 0.1 |
| 0.2 | 0.2 | 0.3 | 0.3 | 0.3 | 0.2 |
| 0.2 | 0.3 | 0.6 | 0.9 | 0.6 | 0.3 |
| 0.3 | 0.3 | 0.9 | 0.9 | 0.5 | 0.3 |

704

NIR

IR

| | | | | | |
|---|---|---|---|---|---|
| 40 | 40 | 40 | 40 | 40 | 40 |
| 30 | 30 | 30 | 30 | 30 | 30 |
| 20 | 20 | 20 | 10 | 10 | 20 |
| 20 | 20 | 30 | 30 | 20 | 20 |

706

802 (NIR; IR)

| | | | | | |
|---|---|---|---|---|---|
| 50 | 50 | 50 | 50 | 50 | 50 |
| 40 | 40 | 40 | 40 | 40 | 40 |
| 30 | 30 | 20 | 10 | 10 | 30 |
| 30 | 30 | 30 | 30 | 20 | 30 |

902 (NIR; IR)

| | | | | | |
|---|---|---|---|---|---|
| 50 | 50 | 50 | 50 | 50 | 50 |
| 40 | 40 | 40 | 40 | 40 | 40 |
| 30 | 30 | 10 | 5 | 5 | 30 |
| 30 | 30 | 20 | 20 | 10 | 30 |

IMAGE PROCESSING DEVICE, IMAGE DISPLAY SYSTEM, IMAGE PROCESSING METHOD, AND RECORDING MEDIUM

This application is a National Stage Entry of PCT/JP2021/006868 filed on Feb. 24, 2021, the contents of all of which are incorporated herein by reference, in their entirety.

TECHNICAL FIELD

The present invention relates to an image processing apparatus, an image display system, an image processing method, and a recording medium.

BACKGROUND ART

Conventionally, a technique of transmitting an image is known (e.g., Patent Literature 1). In recent years, there has been an increasing demand for a system in which an image that has been captured from a movable body is transmitted and monitored by a monitoring person, from the viewpoint of remote control and remote monitoring.

CITATION LIST

Patent Literature

[Patent Literature 1]
Japanese Patent Application Publication, Tokukai, No. 2004-363974

SUMMARY OF INVENTION

Technical Problem

When an image that has been captured from a movable body is transmitted, it is preferable to cause the data volume of encoded data not to be excessively large. However, a technique of reducing the data volume of encoded data pertaining to an image that has been captured from a movable body is not known.

Patent Literature 1 discloses (i) cutting out a video that has been captured at high resolution, (ii) carrying out an encoding process with respect to an extracted important region, and (iii) carrying out transmission in a state where the extracted important region is superimposed on a non-important region. However, it is difficult to address the above problem when an image that has been captured from a movable body is transmitted.

An example aspect of the present invention has been made in view of the above problem, and an example object thereof is to provide a technique which makes it possible to suitably reduce the data volume of an image that has been captured from a movable body.

Solution to Problem

An image processing apparatus in accordance with an example aspect of the present invention: includes at least one processor, the at least one processor carrying out: an obtaining process of obtaining an image which has been captured from a movable body; an importance level estimating process of estimating levels of importance with respect to a respective plurality of regions included in the image; a quality parameter estimating process of estimating preliminary quality parameters with respect to the respective plurality of regions included in the image; and a quality parameter determining process of determining quality parameters with respect to the respective plurality of regions with reference to the preliminary quality parameters which have been estimated and the levels of importance.

An image processing method in accordance with an example aspect of the present invention includes: obtaining an image which has been captured from a movable body; estimating levels of importance with respect to a respective plurality of regions included in the image; estimating preliminary quality parameters with respect to the respective plurality of regions included in the image; and determining quality parameters with respect to the respective plurality of regions with reference to the preliminary quality parameters which have been estimated and the levels of importance.

A non-transitory recording medium in accordance with an example aspect of the present invention is a non-transitory recording medium in which a program for causing a computer to function as an information processing apparatus is stored, the program causing the computer to function as: an obtaining means for obtaining an image; an importance level estimating means for estimating levels of importance with respect to a respective plurality of regions included in the image; a quality parameter estimating means for estimating preliminary quality parameters with respect to the respective plurality of regions included in the image; and a quality parameter determining means for determining quality parameters with respect to the respective plurality of regions with reference to the preliminary quality parameters which have been estimated and the levels of importance.

Advantageous Effects of Invention

According to an example aspect of the present invention, it is possible to suitably reduce the data volume of an image that has been obtained.

DESCRIPTION OF EMBODIMENTS

First Example Embodiment

The following description will discuss, in detail, a first example embodiment of the present invention with reference to drawings. The present example embodiment is made the basis of example embodiments described later. An image processing apparatus 100 in accordance with the present example embodiment is an apparatus which estimates levels of importance with respect to a respective plurality of regions included in an obtained image and determines quality parameters with respect to the respective plurality of regions with reference to the levels of importance.

(Configuration of Image Processing Apparatus)

Figure 1:
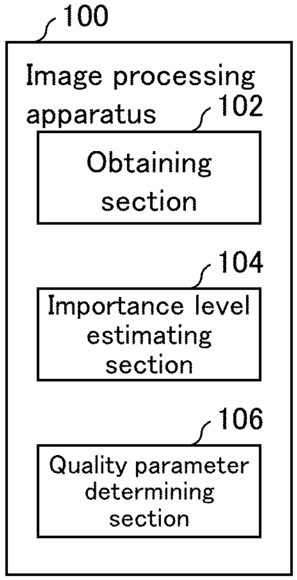
FIG. 1 is a block diagram illustrating a configuration of an image processing apparatus in accordance with a first example embodiment of the present invention.

A configuration of the image processing apparatus 100 in accordance with the present example embodiment is described with reference to FIG. 1. FIG. 1 is a block diagram illustrating the configuration of the image processing apparatus 100. As illustrated in FIG. 1, the image processing apparatus 100 includes an obtaining section 102, an importance level estimating section 104, and a quality parameter determining section 106.

Note that the obtaining section 102 is an embodiment of an obtaining means recited in the claims. The importance level estimating section 104 is an embodiment of an importance level estimating means recited in the claims. The quality parameter determining section 106 is an embodiment of a quality parameter determining means recited in the claims.

As an example, the image processing apparatus 100 can be used to deliver an image necessary to remotely control a movable body such as a self-driving vehicle, a robot, or a drone. In such remote control, for example, an image which has been captured by a camera provided to the movable body is processed by the image processing apparatus 100, and the processed image is transmitted to a remote location such as an operation monitoring center. This makes it possible for a person to monitor, from the remote location, whether the movable body is appropriately operated.

In a case where the captured image has a large data volume, there is a possibility that, when the communication band drops due to, for example, deterioration of a communication condition, sufficient monitoring cannot be carried out due to, for example, disturbance of the image. Therefore, it is preferable to reduce the data volume of the image while maintaining the quality of the image to such a degree as to be necessary for monitoring.

Each element included in the image processing apparatus 100 is described below.

The obtaining section 102 obtains an image. The image obtained by the obtaining section 102 is an image which has been captured from a movable body such as a self-driving vehicle, a robot, or a drone. More specifically, the image obtained by the obtaining section 102 is an image which has been captured by a camera (image capturing apparatus) provided to the movable body.

The image obtained by the obtaining section 102 preferably includes an angle of view in a direction of traveling of the movable body (i.e., forward of the movable body). However, this does not limit the present example embodiment. As an example, the image obtained by the obtaining section 102 may include an angle of view of a side opposite to the direction of traveling of the movable body (i.e., rearward of the movable body) or may include an angle of view in a direction perpendicular to the direction of traveling of the movable body (i.e., sideward of the movable body).

The image obtained by the obtaining section 102 may be a still image or may be a moving image. The image captured from the movable body is transmitted to the obtaining section 102 by wired communication, wireless communication, or a combination of wired communication and wireless communication. Note that, in the present example embodiment, the image obtained by the obtaining section 102 is also referred to as a target image.

The importance level estimating section 104 estimates levels of importance with respect to a respective plurality of regions included in the image which has been obtained by the obtaining section 102. Note, here, that how to determine the plurality of regions can be, as an example, such that the importance level estimating section 104 actively determines the plurality of regions. However, this does not limit the present example embodiment. In other words, the importance level estimating section 104 divides, into the plurality of regions, the image obtained by the obtaining section 102 or sets the plurality of regions in the image obtained by the obtaining section 102, and estimates the levels of importance with respect to the respective plurality of regions. Note that the number of regions set by the importance level estimating section 104 may differ from the number of regions with respect to which the importance level estimating section 104 estimates the levels of importance. For example, the importance level estimating section 104 may estimate the levels of importance with respect to respective partial regions out of the plurality of regions set by the importance level estimating section 104.

Note that a detailed example of an importance level estimating algorithm employed by the importance level estimating section 104 can be, as an example, a Self-Attention algorithm. However, this does not limit the present embodiment.

The quality parameter determining section 106 determines quality parameters with respect to the respective plurality of regions with reference to the levels of importance which have been estimated by the importance level estimating section 104. Note, here, that the quality parameters in the present example embodiment indicate parameters which specify with what degrees of quality the respective regions of the target image are encoded in an encoding process for generating encoded data of the target image. The quality parameters in the present example embodiment can be each a quantum parameter (QP) for specifying roughness of a quantization process that is applied to the target image.

However, this does not limit the present example embodiment.

As an example, the quality parameter determining section 106 can set the quality parameters so that the levels of importance which have been estimated by the importance level estimating section 104 and the quality parameters have a positive correlation. In other words, the quality parameter determining section 106 can set the quality parameters so that as the levels of importance which have been estimated by the importance level estimating section 104 become higher, the image quality of the regions becomes higher.

(Effects of Image Processing Apparatus)

The image processing apparatus 100 configured as described above estimates levels of importance with respect to a respective plurality of regions included in a target image which has been captured from a movable body, and determines quality parameters with respect to the respective plurality of regions with reference to the levels of importance which have been estimated. Note, here, that the quality parameters are parameters which specify roughness of an encoding process that is applied to the target image.

Therefore, according to the image processing apparatus 100 configured as described above, it is possible to specify, in accordance with a corresponding level of importance, the roughness of the encoding process with respect to each of the plurality of regions included in the target image which has been captured from the movable body.

Therefore, according to the image processing apparatus 100 configured as described above, it is possible to suitably reduce the data volume of the target image which has been captured from the movable body. As an example, by applying the image processing apparatus 100 to remote control, it is possible to carry out suitable monitoring while suitably suppressing a transmission load.

(Description of Image Processing Method)

Figure 2:
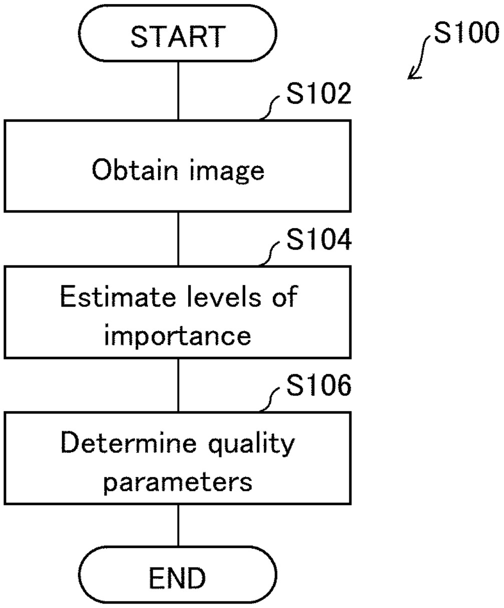
FIG. 2 is a flowchart illustrating a flow of an image processing method in accordance with the first example embodiment of the present invention.

FIG. 2 is a flowchart illustrating a flow of an image processing method S100 in accordance with the first example embodiment. As illustrated in FIG. 2, the image processing method S100 in accordance with the first example embodiment includes steps S102 to S106.

(Step S102)

In the image processing method in accordance with the first example embodiment, in the step S102, the obtaining section 102 obtains an image which has been captured from a movable body. The obtaining section 102 obtains an image which has been captured from a movable body such as a self-driving vehicle, a robot, or a drone. More specifically, the obtaining section 102 obtains an image which has been captured by a camera (image capturing apparatus) provided to a movable body. Details of this step are similar to the details given in the description of the obtaining section 102, and therefore a description thereof is omitted.

(Step S104)

In the image processing method in accordance with the first example embodiment, in the step S104, the importance level estimating section 104 estimates levels of importance with respect to a respective plurality of regions included in the image. Details of this step are similar to the details given in the description of the importance level estimating section 104, and therefore a description thereof is omitted.

(Step S106)

In the image processing method in accordance with the first example embodiment, in the step S106, the quality parameter determining section 108 determines quality parameters with respect to the respective plurality of regions with reference to the levels of importance. Note, here, that the quality parameters in the present example embodiment are similar to those described in connection with the configuration of the quality parameter determining section 106 included in the image processing apparatus 100, and therefore a description thereof is omitted.

(Effects of Image Processing Method)

According to the image processing method S100 described above, levels of importance are estimated with respect to a respective plurality of regions included in a target image which has been captured from a movable body, and quality parameters are determined with respect to the respective plurality of regions with reference to the levels of importance which have been estimated. Note, here, that the quality parameters are parameters which specify roughness of an encoding process that is applied to the target image.

Therefore, according to the image processing method S100 described above, it is possible to specify, in accordance with a corresponding level of importance, the roughness of the encoding process with respect to each of the plurality of regions included in the target image which has been captured from the movable body.

Therefore, it is possible to suitably reduce the data volume of the target image which has been captured from the movable body. As an example, by applying the image processing method S100 to remote control, it is possible to carry out suitable monitoring while suitably suppressing a transmission load.

Second Example Embodiment

The following description will discuss, in detail, a second example embodiment of the present invention with reference to drawings. The present example embodiment is made the basis of an example embodiment of an image display system described later. An image display system 10*a* in accordance with the present example embodiment is a system which (i) determines quality parameters with respect to a respective plurality of regions included in an image which has been obtained, (ii) transmits encoded image data which has been encoded with use of the quality parameters that have been determined, and (iii) displays the image in a display section.

(Configuration of Image Display System)

Figure 3:
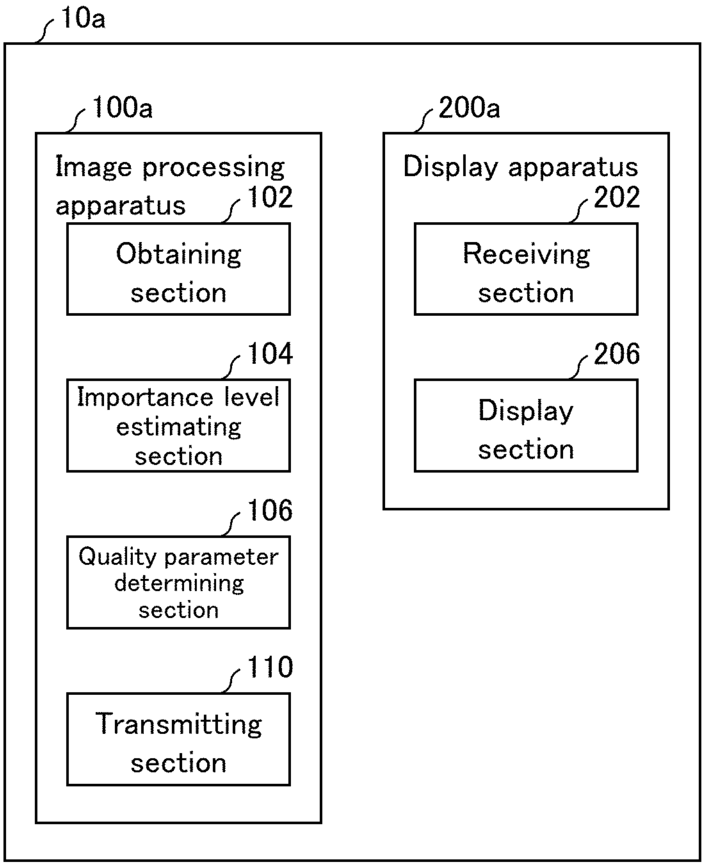
FIG. 3 is a block diagram illustrating a configuration of an image display system in accordance with a second example embodiment of the present invention.

A configuration of the image display system 10*a* in accordance with the second example embodiment is described with reference to FIG. 3. FIG. 3 is a block diagram illustrating the configuration of the image display system 10*a*. As illustrated in FIG. 3, the image display system 10*a* includes an image processing apparatus 100*a* and a display apparatus 200*a*. As illustrated in FIG. 3, the image processing apparatus 100*a* includes an obtaining section 102, an importance level estimating section 104, a quality parameter determining section 106, and a transmitting section 110. As illustrated in FIG. 3, the display apparatus 200*a* includes a receiving section 202 and a display section 206.

Note that the transmitting section 110 is an embodiment of a transmitting means recited in the claims. The receiving section 202 is an embodiment of a receiving means recited in the claims. The display section 206 is an embodiment of a display means recited in the claims.

As an example, the image display system 10*a* can be used to remotely control a movable body such as a self-driving vehicle, a robot, or a drone, similarly to the image processing apparatus 10 in accordance with the first example embodiment. In such remote control, for example, an image which has been captured by a camera provided to the movable body is processed by the image processing apparatus 100*a*, and the processed image is transmitted to a remote location such as an operation monitoring center. The transmitted image is received by the display apparatus 200*a* disposed at the remote location, and is displayed by the display section 206. This makes it possible for a person to monitor, from the remote location, whether the movable body is appropriately operated.

Note that, as the display section 206, a liquid crystal display panel or the like each of which displays an image can be used. However, the display section 206 is not limited to this example.

The image processing apparatus 100*a* and the display apparatus 200*a* included in the image display system 10*a* are described below.

(Configuration of Image Processing Apparatus)

The image processing apparatus 100*a* includes the obtaining section 102, the importance level estimating section 104, the quality parameter determining section 106, and the transmitting section 110. Each of these sections is described below.

The obtaining section 102 obtains an image which has been captured from a movable body. The image obtained by the obtaining section 102 is an image which has been captured from a movable body such as a self-driving vehicle, a robot, or a drone. The obtaining section 102 in accordance with the present example embodiment is similar to the configuration described in the first example embodiment. Thus, a detailed description thereof is omitted here.

The importance level estimating section 104 estimates levels of importance with respect to a respective plurality of regions included in the image which has been obtained by the obtaining section 102. The importance level estimating section 104 in accordance with the present example embodiment is similar to the configuration described in the first example embodiment. Thus, a detailed description thereof is omitted here.

The quality parameter determining section 106 determines quality parameters with respect to the respective plurality of regions with reference to the levels of importance which have been estimated by the importance level estimating section 104. The quality parameter determining section 106 in accordance with the present example embodiment is similar to the configuration described in the first example embodiment. Thus, a detailed description thereof is omitted here.

The transmitting section 110 transmits encoded data which has been encoded with use of the quality parameters that have been determined by the quality parameter determining section 106. The transmitting section 110 can transmit the encoded image data to a remote location with use of, as an example, wireless communication. The encoded image data transmitted by the transmitting section 110 is encoded with use of the quality parameters which have been determined by the quality parameter determining section 106. Therefore, a transmission load is suppressed.

(Configuration of Display Apparatus)

The display apparatus 200*a* includes the receiving section 202 and the display section 206. Each of these sections is described below.

The receiving section 202 receives the encoded data that has been transmitted from the transmitting section 110. The receiving section 202 can be configured to, as an example, include an antenna and receive the encoded data that has been transmitted by wireless communication.

The display section 206 displays the image which is obtained by decoding the encoded data that has been received by the receiving section 202. As described above, as the display section 206, a liquid crystal display panel or the like each of which displays an image can be used. However, the display section 206 is not limited to this example. The image display system 10*a* may be configured to include a plurality of display apparatuses 200*a*. By employing such a configuration, it is possible for a plurality of people to monitor the same image at separate locations.

Further, in the present example embodiment, the display section 206 may be configured to have a plurality of divided display regions and display, in the respective plurality of display regions, a plurality of images which have been captured from respective different movable bodies. Alternatively, the display apparatus 200*a* may be configured to include a plurality of display sections 206 and display, in the respective plurality of display sections 206, a plurality of images which have been captured from respective different movable bodies. Such configurations make it possible for a single person to suitably carry out remote monitoring with respect to a plurality of movable bodies.

(Effects of Image Display System)

According to the image display system 10*a* configured as described above, the image processing apparatus 100*a* is capable of specifying, in accordance with a corresponding level of importance, roughness of an encoding process with respect to each of a plurality of regions included in a target image which has been captured from a movable body. This suitably reduces image data which has been obtained by capturing from the movable body and then encoded. It is therefore possible to suitably suppress a transmission load.

(Description of Display Method in Image Display System)

Figure 4:
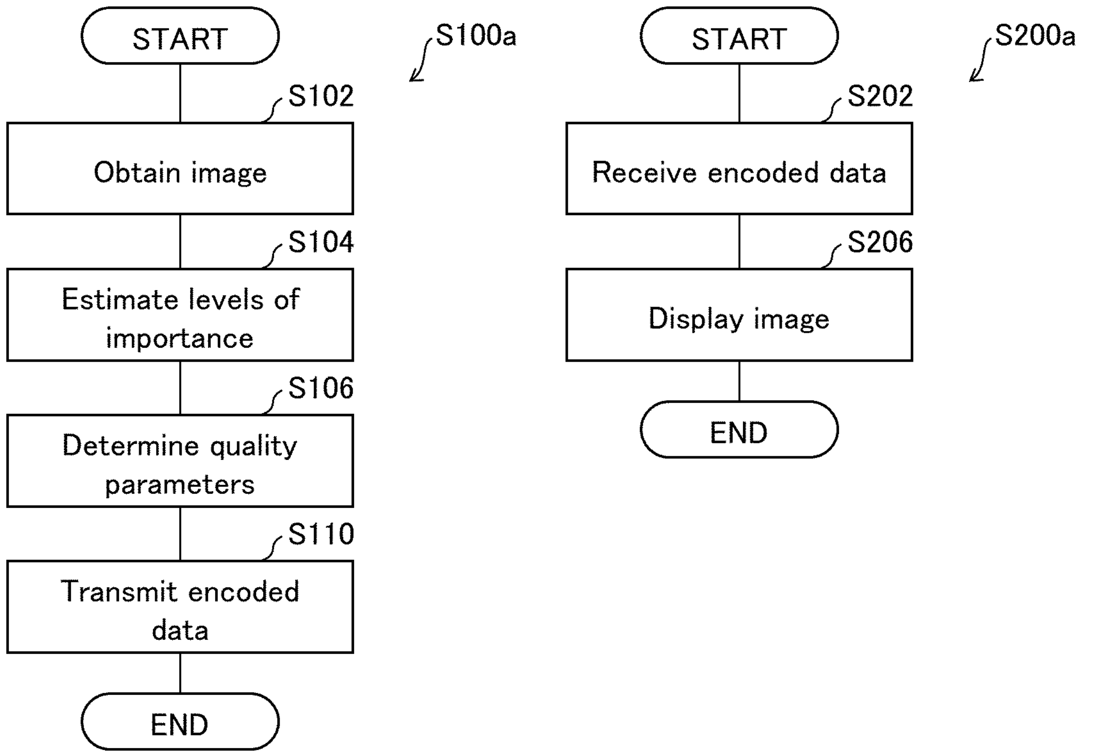
FIG. 4 is a flowchart illustrating a flow of an image processing method in accordance with the second example embodiment of the present invention.

FIG. 4 is a flowchart illustrating a flow of a display method in the image display system 10*a* in accordance with the second example embodiment. FIG. 4 shows a flowchart S100*a* which illustrates a flow of a process in the image processing apparatus 100*a* and a flowchart S200*a* which illustrates a flow of a process in the display apparatus 200*a*. As illustrated in FIG. 4, the flowchart S100*a* which illustrates the flow of the process in the image processing apparatus 100*a* in accordance with the second example embodiment includes steps S102 to S110. The flowchart S200*a* which illustrates the flow of the process in the display apparatus 200*a* in accordance with the second example embodiment includes steps S202 and S206.

(Description of Flow of Process in Image Processing Apparatus)

(Step S102)

In the process in the image processing apparatus 100*a* in accordance with the second example embodiment, in the step S102, the obtaining section 102 obtains an image which has been captured from a movable body. Since a process carried out by the obtaining section 102 in this step is similar to the process described in the first example embodiment, a detailed description is omitted here.

(Step S104)

In the process in the image processing apparatus 100*a* in accordance with the second example embodiment, in the step S104, the importance level estimating section 104 estimates levels of importance with respect to a respective plurality of regions included in the image. Since a process carried out by the importance level estimating section 104 in this step is similar to the process described in the first example embodiment, a detailed description is omitted here.

(Step S106)

In the process in the image processing apparatus 100*a* in accordance with the second example embodiment, in the step S106, the quality parameter determining section 106 determines quality parameters with respect to the respective plurality of regions with reference to the levels of importance. Since a process carried out by the quality parameter determining section 106 in this step is similar to the process described in the first example embodiment, a detailed description is omitted here.

(Step S110)

In the process in the image processing apparatus 100*a* in accordance with the second example embodiment, in the step S110, the transmitting section 110 transmits encoded data which has been encoded with use of the quality parameters that have been determined by the quality parameter determining section 106. Since a process carried out by the transmitting section 110 in this step is similar to the process described in connection with the image processing apparatus 100*a* in the second example embodiment, a detailed description is omitted here.

(Description of Flow of Process in Display Apparatus)

The flow of the process in the display apparatus 200*a* is described below step-by-step.

(Step S202)

In the process in the display apparatus 200*a* in accordance with the second example embodiment, in the step S202, the receiving section 202 receives the encoded data that has been transmitted from the transmitting section 110. Since a process carried out by the receiving section 202 in this step is similar to the process described in connection with the display apparatus 200*a* of the second example embodiment, a detailed description is omitted here.

(Step S206)

In the process in the display apparatus 200*a* in accordance with the second example embodiment, in the step S202, the display section 206 displays the image which is obtained by decoding the encoded data that has been received by the receiving section 202. Since a process carried out by the display section 206 in this step is similar to the process described in connection with the display apparatus 200*a* of the second example embodiment, a detailed description is omitted here.

(Effects of Display Method in Image Display System)

As has been described, according to the display method in the image display system 10*a*, it is possible to specify, in accordance with a corresponding level of importance, roughness of an encoding process with respect to each of a plurality of regions included in a target image which has been captured from a movable body. That is, image data which has been obtained by capturing from a movable body and then encoded is suitably reduced. Therefore, according to the display method in the image display system 10*a*, it is possible to suitably suppress a transmission load.

Third Example Embodiment

The following description will discuss, in detail, a third example embodiment of the present invention with reference to drawings. The present example embodiment is one example embodiment of an image display system. An image display system 10*b* in accordance with the present example embodiment estimates levels of importance and quality parameters with respect to a respective plurality of regions included in an obtained image, and then determines quality parameters with reference to the estimated levels of importance and the estimated quality parameters. The image display system 10*b* transmits encoded data that has been encoded with use of the determined quality parameters, and displays the image in a display section.

(Configuration of Image Display System)

Figure 5:
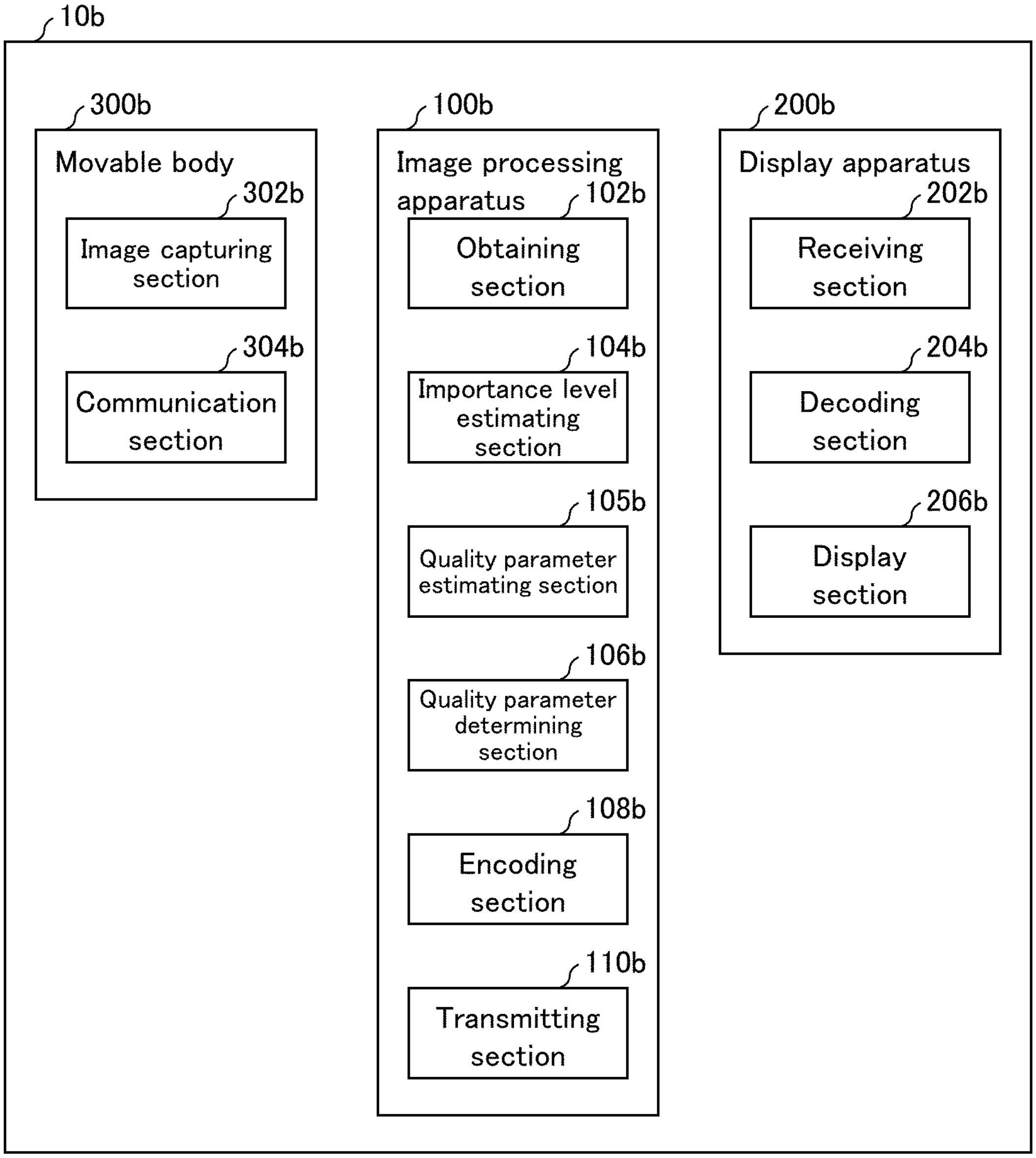
FIG. 5 is a block diagram illustrating a configuration of an image display system in accordance with a third example embodiment of the present invention.

A configuration of the image display system 10*b* in accordance with the third example embodiment is described with reference to FIG. 5. FIG. 5 is a block diagram illustrating the configuration of the image display system 10*b*. As illustrated in FIG. 5, the image display system 10*b* includes an image processing apparatus 100*b*, a display apparatus 200*b*, and a movable body 300*b*.

As an example, the image display system 10*b* can be used to remotely control a movable body such as a self-driving vehicle, a robot, or a drone, similarly to the image processing apparatus 10 in accordance with the first example embodiment. In such remote control, for example, an image which has been captured by a camera provided to the movable body is processed by the image processing apparatus 100*b*, and the processed image is transmitted to a remote location such as an operation monitoring center. The transmitted image is received by the display apparatus 200*b* disposed at the remote location, and is displayed by a display section 206*b*. This makes it possible for a person to monitor, from the remote location, whether the movable body is appropriately operated.

Note that, as the display section 206*b*, a liquid crystal display panel or the like each of which displays an image can be used. Note, however, that the display section 206*b* is not limited to this example.

The image processing apparatus 100*b* and the display apparatus 200*b* included in the image display system 10*b* are described below.

(Description of Movable Body)

As illustrated in FIG. 5, the movable body 300*b* includes an image capturing section 302*b* and a communication section 304*b*. Each of these sections is described below.

The image capturing section 302*b* may be, as an example, an image capturing apparatus such as a camera. The image capturing section 302*b* may obtain a still image or may obtain a moving image. The image capturing section 302*b* preferably obtains an image which includes an angle of view in a direction of traveling of the movable body 300*b* (i.e., forward of the movable body 300*b*). However, this does not limit the present example embodiment. As an example, the image capturing section 302*b* may obtain an image which includes an angle of view of a side opposite to the direction of traveling of the movable body 300*b* (i.e., rearward of the movable body 300*b*) or may obtain an image which includes an angle of view in a direction perpendicular to the direction of traveling of the movable body (i.e., sideward of the movable body).

The communication section 304*b* transmits, to the image processing apparatus 100*b*, the image obtained by the image capturing section 302*b*. The transmitting section 304*b* can be configured to, as an example, include an antenna and transmit encoded data with use of wireless communication. However, this does not limit the present embodiment. Wired communication may be used or a combination of wireless communication and wired communication may be used.

(Configuration of Image Processing Apparatus)

The image processing apparatus 100*b* includes an obtaining section 102*b*, an importance level estimating section 104*b*, a quality parameter estimating section 105*b*, a quality parameter determining section 106*b*, an encoding section 108*b*, and a transmitting section 110*b*, as illustrated in FIG. 5. Each of these sections is described below.

Note that the obtaining section 102*b* is an embodiment of the obtaining means recited in the claims. The importance level estimating section 104*b* is an embodiment of the importance level estimating means recited in the claims. The quality parameter estimating section 105*b* is an embodiment of a quality parameter estimating means recited in the claims. The quality parameter determining section 106*b* is an embodiment of the quality parameter determining means recited in the claims. The encoding section 108*b* is an embodiment of an encoding means recited in the claims. The transmitting section 110*b* is an embodiment of the transmitting means recited in the claims.

(Obtaining Section)

The obtaining section 102*b* obtains an image. The image obtained by the obtaining section 102*b* is an image which has been captured from the movable body 300*b*. A configuration of the obtaining section 102*b* in accordance with the present example embodiment is similar to that of the obtaining section 102 described in the first example embodiment. However, a detailed example process carried out by the obtaining section 102*b* is described later.

(Importance Level Estimating Section)

The importance level estimating section 104*b* estimates levels of importance with respect to a respective plurality of regions included in the image which has been obtained by the obtaining section 102*b*. The importance level estimating section 104*b* in accordance with the present example embodiment has a configuration similar to that of the importance level estimating section 104 described in the first example embodiment. As an example, the importance level estimating section 104*b* can be configured with use of an inference model that has been trained by the following training process including a replacing step, an evaluating step, and a training step. A detailed example process carried out by the importance level estimating section 104*b* is described later.

(Replacing Step)

At least one of a plurality of regions included in an image for training which has been obtained by the obtaining section 102*b* is replaced with alternative data in accordance with levels of importance estimated by the importance level estimating section 104*b*. This generates replaced data.

(Evaluating Step)

An evaluation value is derived by referring to the replaced data. Note, here, that, in this evaluating step, the image for training which has been obtained by the obtaining section 102*b* and which has not been replaced may be further referred to.

(Training Step)

The importance level estimating section 104*b* is trained with reference to the evaluation value. Note, here, that training of the importance level estimating section 104*b* can be carried out by updating various parameters, which are possessed by the inference model that functions as the importance level estimating section 104*b*, in accordance with the evaluation value.

(Quality Parameter Estimating Section)

The quality parameter estimating section 105*b* estimates preliminary quality parameters with respect to a respective plurality of regions included in the image which has been obtained by the obtaining section 102*b*. As an example, the quality parameter estimating section 105 estimates the preliminary quality parameters so that encoding efficiency in a case where the image is encoded is improved. As an example, estimation of the preliminary quality parameters, which is carried out prior to determination of quality parameters, can be carried out with use of a moving image encoding technique such as H.265. However, this does not limit the present example embodiment.

Note that, in the present example embodiment, the expression "preliminary quality parameter" is formally introduced in order not to cause literal confusion with the "quality parameter" which is determined by the quality parameter determining section 106*b* (described later). The word "preliminary" does not represent any tangible limitation in the moving image encoding technique.

In the present example embodiment, similarly to the "quality parameter", the "preliminary quality parameter" can be, as an example, a quantum parameter (QP) for specifying roughness of a quantization process that is applied to a target image.

Note also that the "plurality of regions" which are referred to by the quality parameter estimating section 105*b* do not need to be the same as the "plurality of regions" which are referred to by the importance level estimating section 104*b*. As an example, the "plurality of regions" which are referred to by the quality parameter estimating section 105*b* may be regions which are referred to as "encoding units", "macroblocks", or the like which are generated or referred to in a moving image encoding process. Meanwhile, the "plurality of regions" which are referred to by the importance level estimating section 104*b* may be, as an example, individual attention regions which are generated or referred to by a Self-Attention algorithm.

A detailed process carried out by the quality parameter estimating section 105*b* is described later with reference to other drawings.

(Quality Parameter Determining Section)

The quality parameter determining section 106*b* determines quality parameters with respect to the respective plurality of regions with reference to the levels of importance and the estimated preliminary quality parameters. In this manner, the quality parameter determining section 106*b* in accordance with the present example embodiment determines the quality parameters with reference to not only the levels of importance but also the preliminary quality parameters. As an example, the quality parameter determining section 106*b* can set the quality parameters so that the levels of importance which have been estimated by the importance level estimating section 104 and the preliminary quality parameters which have been estimated by the quality parameter estimating section have a positive correlation. That is, the quality parameter determining section 106*b* can set the quality parameters so that as the levels of importance which have been estimated by the importance level estimating section 104*b* become higher, the image quality of the regions becomes higher.

Note that, as described above, in general, there can be a case where the "plurality of regions" which are referred to by the quality parameter estimating section 105*b* and the "plurality of regions" which are referred to by the importance level estimating section 104*b* are not the same. In other words, there can be a case where each of the plurality of regions (e.g., regions R1*a*, R2*a*, R3*a* . . . ) with respect to which the quality parameter estimating section 105*b* gives the preliminary quality parameters does not completely overlap with each of the plurality of regions (e.g., regions Rib, R2*b*, and R3*b*) with respect to which the importance level estimating section 104*b* has given the levels of importance.

In such a case, the quality parameter determining section 106*b* can be configured to determine a quality parameter of each region with respect to which the quality parameter estimating section 105*b* has given a preliminary quality parameter, with reference to a region which is included in or overlaps with the region and with respect to which the importance level estimating section 104*b* has given the level of importance.

As an example, the quality parameter determining section 106*b* can be configured such that, in a case where the regions Rib and R2*b* with respect to which the importance level estimating section 104*b* has given levels of importance are included in or overlap the region Ria with respect to which the quality parameter estimating section 105*b* has given a preliminary quality parameter, the quality parameter determining section 106*b* determines a quality parameter of the region Ria with reference to at least one of the levels of importance which have been given to the regions Rib and R2*b*.

(Encoding Section) The encoding section 108*b* generates encoded data by encoding the target image with use of the quality parameters determined by the quality parameter determining section 106*b*. Note that an encoding process carried out by the encoding section 208 constitutes a part of the function of the transmitting section 110 described in the second example embodiment.

(Transmitting Section)

The transmitting section 110*b* transmits the encoded data generated by the encoding section 108*b*. A transmitting process carried out by the transmitting section 110*b* is similar to the function of the transmitting section 110 in the second example embodiment except for the above-described encoding process.

The transmitting section 110*b* can be configured to, as an example, include an antenna and transmit the encoded data with use of wireless communication. However, this does not limit the present embodiment. Wired communication may be used or a combination of wireless communication and wired communication may be used.

(Configuration of Display Apparatus)

The display apparatus 200*b* includes a receiving section 202*b*, a decoding section 204*b*, and a display section 206*b*. The function of the display apparatus 200*b* is basically the same as that of the display apparatus 200*a* of the second example embodiment. Therefore, a description is given below except for a part which overlaps with the description of the display apparatus 200*a* of the second example embodiment.

Note that the receiving section 202*b* is an embodiment of the receiving means recited in the claims. The display section 206*b* is an embodiment of the display means recited in the claims.

(Receiving Section)

The receiving section 202*b* receives the encoded data that has been transmitted from the transmitting section 110*b*.

(Decoding Section)

The decoding section 204*b* decodes the encoded data received by the receiving section 202*b*, thereby converting the encoded data into image data. The decoding section 204*b* has a part of the function of the display section 206 of the second example embodiment.

A detailed decoding algorithm employed by the decoding section 204*b* is preferably an algorithm which corresponds to an encoding algorithm employed by the encoding section 108*b*. However, this does not limit the present example embodiment. The decoding section 204*b* can also employ a configuration such that the decoding section 204*b* carries out a decoding process with respect to each of the plurality of regions with reference to a corresponding one of the quality parameters which have been determined by the quality parameter determining section 106*b* with respect to the respective plurality of regions and which are included in the encoded data.

This causes the quality of the image obtained after decoding by the decoding section 204*b* to correspond to the quality parameters which have been determined by the quality parameter determining section 106*b*.

The display section 206*b* displays the image obtained after decoding by the decoding section 204*b*. The display section 206*b* has a function similar to the function of the display section 206 of the second example embodiment except for the function of the decoding section 204*b*.

(Effects of Image Display System)

According to the image display system 10*b* configured as described above, the image processing apparatus 100*b* is capable of specifying, in accordance with a corresponding level of importance, roughness of an encoding process with respect to each of a plurality of regions included in a target image which has been captured from a movable body. This suitably reduces image data which has been obtained by capturing from the movable body and then encoded. It is therefore possible to suitably suppress a transmission load.

A flow of a display method in the image display system 10*b* in accordance with the third example embodiment is described below with reference to FIGS. 6 to 9.

(Description of Display Method in Image Display System)

Figure 6:
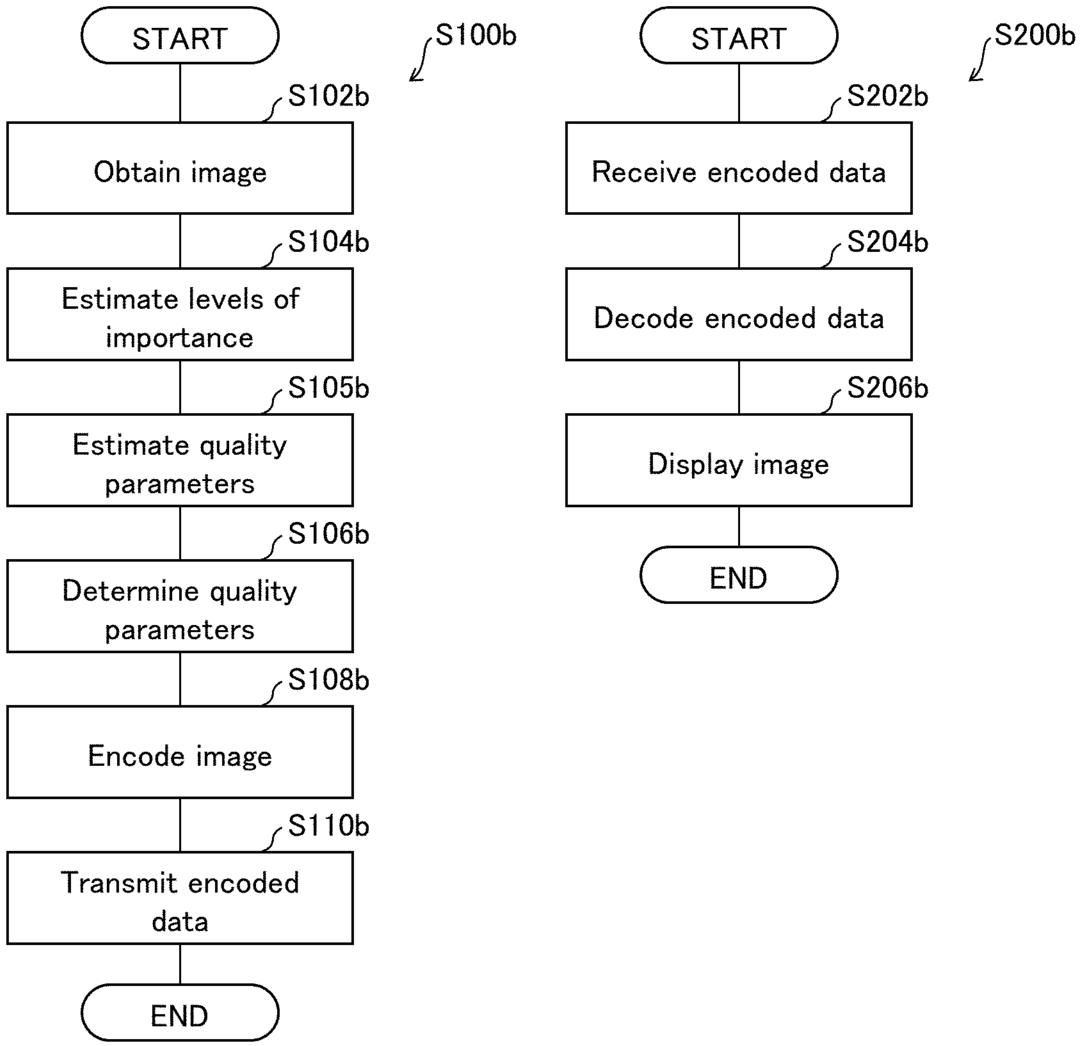
FIG. 6 is a flowchart illustrating a flow of an image processing method in accordance with the third example embodiment of the present invention.

FIG. 6 is a flowchart illustrating the flow of the display method in the image display system 10*b* in accordance with the third example embodiment. FIG. 6 shows a flowchart S100*b* which illustrates a flow of a process in the image processing apparatus 100*b* and a flowchart S200*b* which illustrates a flow of a process in the display apparatus 200*b*. As illustrated in FIG. 6, the flowchart S100*b* which illustrates the flow of the process in the image processing apparatus 100*b* in accordance with the third example embodiment includes steps S102*b* to S110*b*.

The flowchart S200*b* which illustrates the flow of the process in the display apparatus 200*b* in accordance with the third example embodiment includes steps S202*b*, S204*b*, and S206*b*.

Figure 7A:
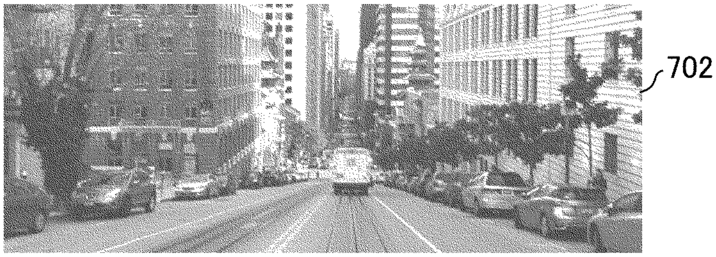
FIG. 7A illustrates an example of an image that has been obtained in a step S102*b* of the processing method in accordance with the third example embodiment of the present invention.
Figures 7B, 7C, 8A:
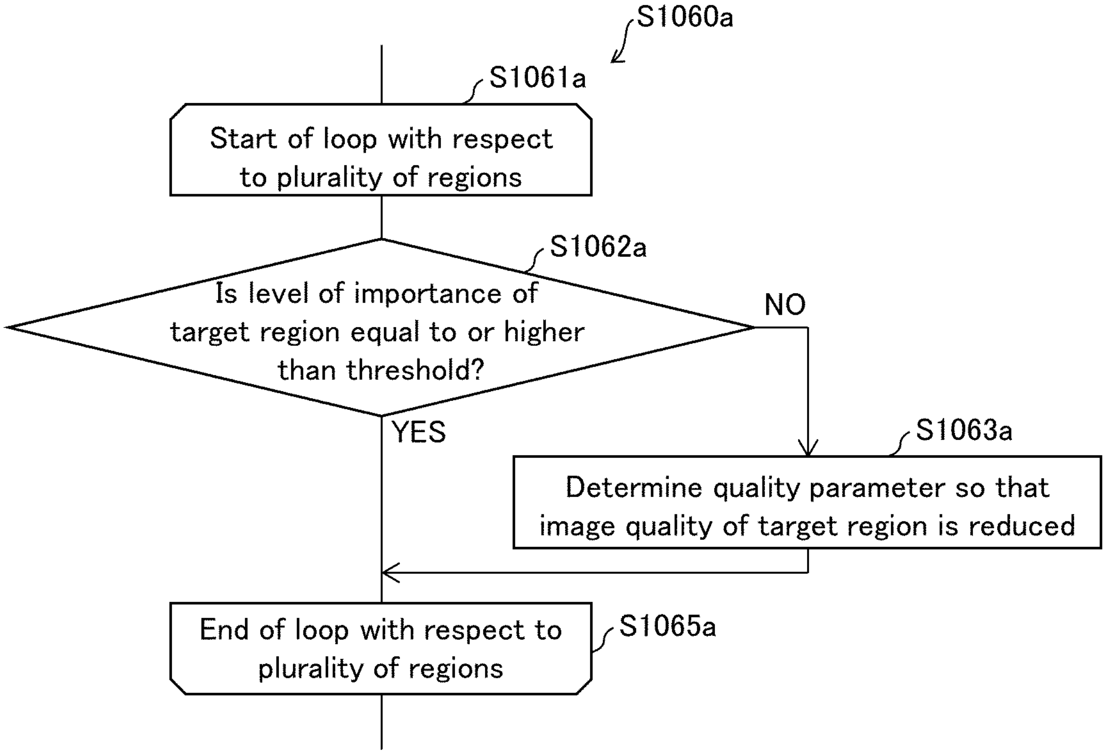
FIG. 7B is a schematic view illustrating examples of levels of importance that have been estimated in a step S104*b* in accordance with the third example embodiment of the present invention.
FIG. 7C is a schematic view illustrating preliminary quality parameters that have been estimated in a step S105*b* in accordance with the third example embodiment of the present invention.
FIG. 8A is a flowchart illustrating an example process 1 in a flow S106*b* of the processing method in accordance with the third example embodiment of the present invention.

FIGS. 7A to 7C illustrate a detailed example of the display method in the image display system 10*b* in accordance with the third example embodiment. An image and schematic views illustrated in these drawings have correspondence with each other. An image 702 illustrated in FIG. 7A is an example of an image which has been captured from the movable body and which has been obtained by the obtaining section 102*b* in the step S102*b*. A schematic view 704 illustrated as FIG. 7B shows levels of importance which have been estimated by the importance level estimating section 104*b* in the step S104*b* with respect to a respective plurality of regions. A schematic view 706 illustrated as FIG. 7C shows preliminary quality parameters which have been estimated by the quality parameter estimating section 105*b* in the step S105*b* with respect to the respective plurality of regions. A flow of an example process is described later with reference to these drawings.

Figure 8B:
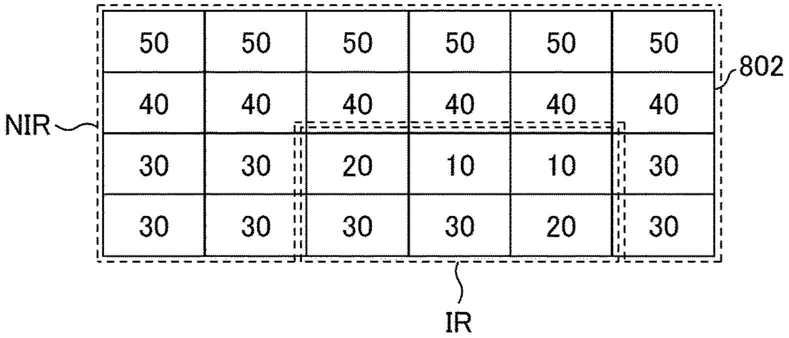
FIG. 8B is a schematic view illustrating quality parameters by the example process 1 in the flow S106*b* of the processing method in accordance with the third example embodiment of the present invention.

FIGS. 8A and 8B each show an example process 1 in the step S106*b* of the display method in the image display system 10*b* in accordance with the third example embodiment. A flowchart S1060*a* illustrated as FIG. 8A shows a flow of the example process 1 of determining quality parameters in the step S106*b* illustrated in FIG. 6. A schematic view 802 illustrated as FIG. 8B shows quality parameters determined by the example process 1 in the step S106*b* with respect to the respective plurality of regions in the schematic view 706 illustrated as FIG. 7C. Details of the flowchart S1060*a* illustrated as FIG. 8A are described later.

Figure 9A:
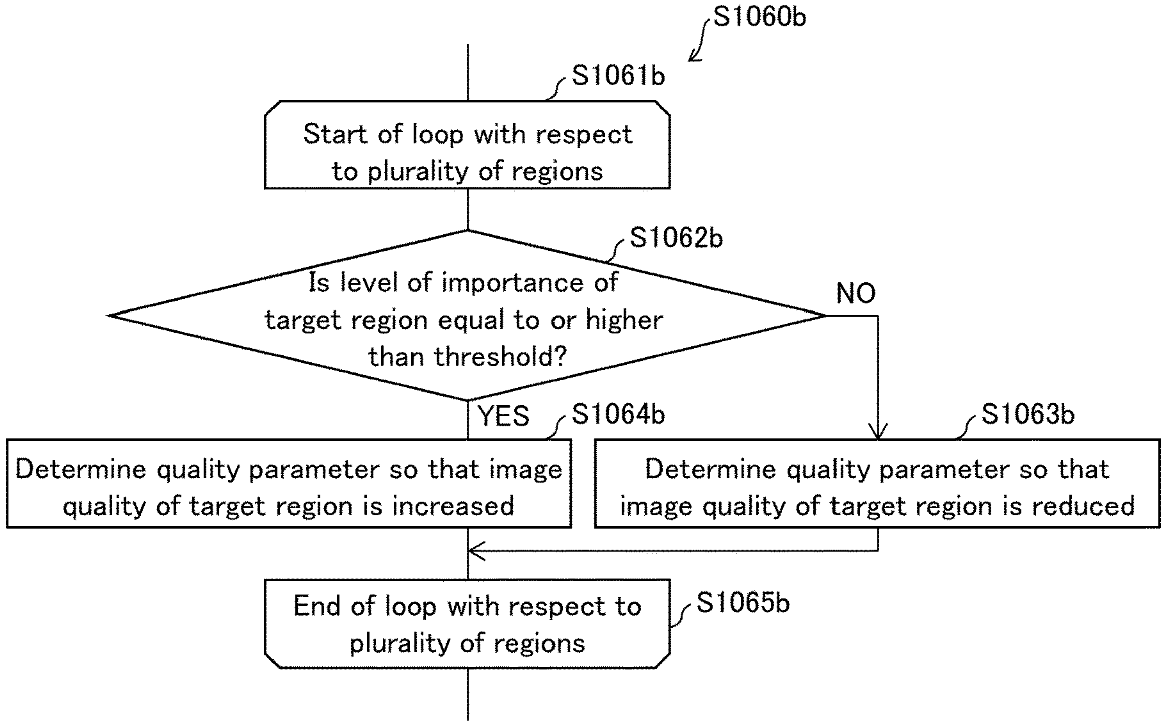
FIG. 9A is a flowchart illustrating an example process 2 in the flow S106*b* of the processing method in accordance with the third example embodiment of the present invention.
Figure 9B:
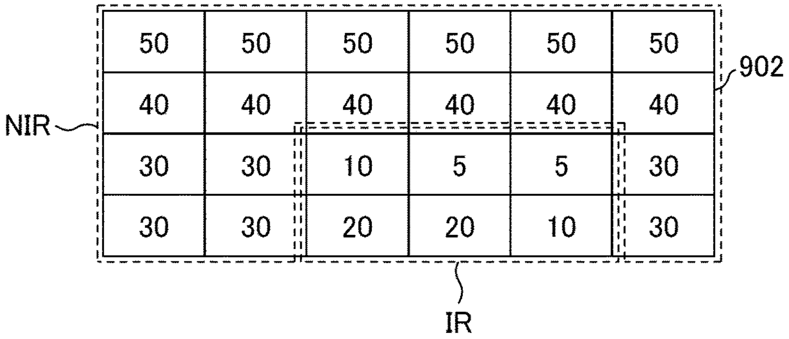
FIG. 9B is a schematic view illustrating quality parameters by the example process 2 in the flow S106*b* of the processing method in accordance with the third example embodiment of the present invention.

FIGS. 9A and 9B each show an example process 2 in the step S106*b* of the display method in the image display system 10*b* in accordance with the third example embodiment. A flowchart S1060*b* illustrated as FIG. 9A shows a flow of the example process 2 of determining quality parameters in the step S106*b* illustrated in FIG. 6. A schematic view 802 illustrated as FIG. 9B shows quality parameters determined by the example process 2 in the step S106*b* with respect to the respective plurality of regions in the schematic view 706 illustrated as FIG. 7C. Details of the flowchart S1060*b* illustrated as FIG. 9A are described later.

(Description of Flow of Process in Image Processing Apparatus)

(Step S102*b*)

In the process in the image processing apparatus 100*b* in accordance with the third example embodiment, in the step S102*b*, the obtaining section 102*b* obtains a captured image. A process carried out by the obtaining section 102*b* in this step includes a process similar to that described in connection with the image display system 10*b*. Therefore, the description already described is omitted.

An example of the image obtained in this step S102*b* is shown in FIG. 7A as the image 702. The image 702 is an image which has been captured by the image capturing section 302 of the movable body 300*b*. As an example, the movable body 300*b* is a traveling vehicle. The image 702 is an image which includes an angle of view of the direction of traveling of the movable body 300*b* (traveling vehicle) (i.e., forward of the movable body 300*b*). In the vicinity of a central part of the image 702, a preceding vehicle which travels ahead is shown, as illustrated in FIG. 7.

(Step S104*b*)

In the process in the image processing apparatus 100*b* in accordance with the third example embodiment, in the step S104*b*, the importance level estimating section 104*b* estimates levels of importance with respect to a respective plurality of regions included in the image. A process carried out by the importance level estimating section 104*b* in this step includes a process similar to that described in connection with the image display system 10*b*. Therefore, the description already described is omitted.

Examples of the levels of importance which have been estimated by the importance level estimating section 104*b* in this step S104*b* are illustrated as the schematic view 704 in FIG. 7B. The importance level estimating section 104*b* divides the image 702, which has been obtained in the step S102*b*, into, as an example, 24 regions with 6 columns and 4 rows as illustrated in the schematic view 704 illustrated in FIG. 7B, and then estimates the levels of importance with respect to the respective 24 regions.

In this importance level estimating process, the importance level estimating section 104*b* classifies each of the plurality of regions, which are included in the image 702 that has been obtained in the step S102*b*, into one of an important region (IR) and a non-important region (NIR) in accordance with a corresponding one of the levels of importance.

As an example, the importance level estimating section 104*b* classifies the 24 regions of the image 702 into 6 important regions (IR) and the other non-important regions (NIR), as illustrated in the schematic view 704 illustrated in FIG. 7B. The 6 important regions (IR) include (i) regions in which the preceding vehicle is shown and (ii) regions in the vicinities thereof.

The importance level estimating section 104*b* gives, to a region which is the highest in level of importance (regions in which the preceding vehicle is shown), a level of importance which has the highest value (in this schematic view 704, 0.9 shown in three regions). Similarly, the importance level estimating section 104*b* gives, to a region which has been estimated as being relatively high in level of importance (regions in the vicinities of the regions in which the preceding vehicle is shown), a relatively high level of importance (in this schematic view 704, 0.5 and 0.6 shown in the other three regions).

Further, the importance level estimating section 104*b* gives, to a region which has been estimated as being the lowest in level of importance (regions in the top row in the schematic view 704), a level of importance which has the lowest value (0.1 in the schematic view 704). The importance level estimating section 104*b* gives a level of importance which has a low value (0.2 in the schematic view 704) to a region which has been estimated by the importance level estimating section 104*b* as being low in level of importance among the other non-important regions (NIR) and which is far from the important regions (IR) among such target regions. The importance level estimating section 104*b* gives a level of importance which has a relatively low value (0.3 in the schematic view 704) to a region which has been estimated as being relatively low in level of importance and which is adjacent to the important regions (IR).

(Step S105*b*)

In the process in the image processing apparatus 100*b* in accordance with the third example embodiment, in the step S105*b*, the quality parameter estimating section 105*b* estimates preliminary quality parameters with respect to the respective plurality of regions included in the image. As an example, the quality parameter estimating section 105*b* estimates the preliminary quality parameters so that encoding efficiency in a case where the image is encoded is improved. A process carried out by the quality parameter estimating section 105*b* in this step includes a process similar to the process carried out by the quality parameter estimating section 105*b* described in connection with the configuration of the image processing apparatus 100*b* of the third example embodiment. Therefore, the description already described is omitted.

Examples of the preliminary quality parameters which have been estimated by the quality parameter estimating section 105*b* in this step S105*b* are illustrated as the schematic view 706 in FIG. 7C. The quality parameter estimating section 105*b* divides the image 702, which has been obtained in the step S102*b*, into, as an example, 24 regions with 6 columns and 4 rows as illustrated in the schematic view 706 of FIG. 7C, and then estimates the preliminary quality parameters with respect to the respective 24 regions. Here, in the detailed examples illustrated in FIGS. 7A to 7C, the "plurality of regions" which are referred to by the quality parameter estimating section 105*b* and the "plurality of regions" which are referred to by the importance level estimating section 104*b* are divided in 24 regions with 6 columns and 4 rows in the same manner. However, this does not limit the present example embodiment. As has been described, in general, these "plurality of regions" can differ from each other.

Note that, in the example illustrated in the schematic view 706 of FIG. 7C, the regions which have been given smaller quality parameters are higher in quality than the regions which have been given larger quality parameters. That is, in the schematic view 706, the quality of the regions which have been given the quality parameters indicated by 40 is the lowest. The quality of the regions which have been given the quality parameters indicated by 10 are the highest.

(Step S106*b*)

In the process in the image processing apparatus 100*b* in accordance with the third example embodiment, in the step S106*b*, the quality parameter determining section 106*b* determines quality parameters with respect to the respective plurality of regions with reference to the levels of importance which have been estimated by the importance level estimating section 104*b* and the preliminary quality parameters which have been estimated by the quality parameter estimating section 105*b*. A process carried out by the quality parameter determining section 106*b* in this step includes a process similar to the process carried out by the quality parameter determining section 106*b* described in connection with the configuration of the image processing apparatus 100*b* of the third example embodiment. Therefore, the description already described is omitted.

Hereinafter, two detailed examples (example process 1 and example process 2) in accordance with the flowcharts illustrated in FIGS. 8A and 9A are described with regard to the step S106*b*.

Example Process 1 in Step S106b

FIG. 8A is the flowchart illustrating the example process 1 in the step S106*b* (in some cases, a flow of a process by this example process 1 is denoted by a reference sign "S1060*a*"). Hereinafter, the example process S1060*a* is described in more detail with reference to FIG. 8A.

(Step S1061*a*)

This step S1061*a* is a start of a loop process with respect to the plurality of regions. In the loop process, each of the plurality of regions included in the target image is sequentially processed in given order.

(Step S1062*a*)

Subsequently, in a step S1062*a*, the quality parameter determining section 106*b* determines whether or not a level of importance of a target region is equal to or higher than a threshold. Here, the target region refers to a region to be processed, out of the plurality of regions with respect to which the quality parameter estimating section 105*b* has estimated the preliminary quality parameters. In a case where the level of importance of the target region is equal to or higher than the threshold (corresponding to YES in this determining step), the quality parameter determining section 106*b* does not carry out any process with respect to the target region, and the process proceeds to a next process. That is, in the target region which has the level of importance that is equal to or higher than the threshold, a preliminary quality parameter is determined, as it is, as a quality parameter. In a case where the level of importance of the target region is not equal to or higher than the threshold (i.e., a value of the level of importance is lower than the threshold) (corresponding to NO in the determining step), the process proceeds to a step S1063*a*.

Note that, as an example, a detailed value of the threshold can be determined in advance in accordance with a desired encoded data volume. However, this does not limit the present example embodiment.

The schematic view 802 illustrated as FIG. 8B shows how, in this example process 1, the quality parameters have been determined in the respective regions illustrated in the schematic view 706 of FIG. 7C. As illustrated in the schematic view 802 of FIG. 8B, in the important regions (IR), the preliminary quality parameters shown in the schematic view 706 of FIG. 7C are set, as they are, as quality parameters. That is, in the target region which has the level of importance that is equal to or higher than the threshold (important region IR), the preliminary quality parameter is determined, as it is, as the quality parameter.

(Step S1063*a*)

In the step S1063*a*, the quality parameter determining section 106*b* determines the quality parameter so that the image quality of the target region is reduced. That is, in the target region which has the level of importance that is lower than the threshold, the quality parameter which has a value that is higher than a value of the preliminary quality parameter given to the target region is given to the target region.

As illustrated in the schematic view 802 of FIG. 8B, as an example, the quality parameter determining section 106*b* gives, to the respective regions included in the non-important regions (NIR), the quality parameters which have values higher than those of the preliminary quality parameters shown in the schematic view 706 of FIG. 7C.

(Step S1065*a*)

This step S1065*a* is an end of the loop process with respect to the plurality of regions.

Example Process 2 in Step S106b

FIG. 9A is the flowchart illustrating the example process 2 in the step S106*b* (in some cases, a flow of a process by this example process 1 is denoted by a reference sign "S1060*b*"). Hereinafter, the example process S1060*b* is described in more detail with reference to FIG. 9A.

(Step S1061*b*)

This step S1061*b* is a start of a loop process with respect to the plurality of regions. In the loop process, each of the plurality of regions included in the target image is sequentially processed in given order.

(Step S1062*b*)

Subsequently, in a step S1062*b*, the quality parameter determining section 106*b* determines whether or not a level of importance of a target region is equal to or higher than a threshold. Here, the target region refers to a region to be processed, out of the plurality of regions with respect to which the quality parameter estimating section 105*b* has estimated the preliminary quality parameters. In a case where the level of importance of the target region is equal to or higher than the threshold (corresponding to YES in this determining step), the quality parameter determining section 106*b* proceeds to a step S1064*b*. In a case where the level of importance of the target region is not equal to or higher than the threshold (i.e., a value of the level of importance is lower than the threshold) (corresponding to NO in the determining step), the process proceeds to a step S1063*b*.

Note that, as an example, a detailed value of the threshold can be determined in advance in accordance with a desired encoded data volume. However, this does not limit the present example embodiment.

(Step S1063*b*)

In the step S1063*a*, the quality parameter determining section 106*b* determines the quality parameter so that the image quality of the target region is reduced. That is, in the target region which has the level of importance that is lower than the threshold, the quality parameter which has a value that is higher than a value of the preliminary quality parameter given to the target region is given to the target region.

As illustrated in the schematic view 902 of FIG. 9B, as an example, the quality parameter determining section 106*b* gives, to the respective regions included in the non-important regions (NIR), the quality parameters which have values higher than those of the preliminary quality parameters shown in the schematic view 706 of FIG. 7C.

(Step S1064*b*)

In the step S1064*b*, the quality parameter determining section 106*b* determines the quality parameter so that the image quality of the target region is increased. That is, in the target region which has the level of importance that is equal to or higher than the threshold, the quality parameter which has a value that is lower than a value of the preliminary quality parameter given to the target region is given to the target region.

As illustrated in the schematic view 902 of FIG. 9B, as an example, the quality parameter determining section 106*b* gives, to the respective regions included in the important regions (IR), the quality parameters which have values lower than those of the preliminary quality parameters shown in the schematic view 706 of FIG. 7C.

(Step S1065*b*)

This step S1065*a* is an end of the loop process with respect to the plurality of regions.

In the present example embodiment, two example processes are described above in detail with regard to the step S106*b*. However, the present example embodiment is not limited to these example processes.

Here, a step subsequent to the step S106*b* is described with reference to FIG. 6.

(Step S108*b*)

In the process in the image processing apparatus 100*b* in accordance with the third example embodiment, in the step S108*b*, the encoding section 108*b* encodes the image into encoded data with use of the quality parameters which have been determined by the quality parameter determining section 106*b*.

(Step S110*b*)

In the process in the image processing apparatus 100*b* in accordance with the third example embodiment, in the step S110*b*, the transmitting section 110*b* transmits the encoded data that has been encoded by the encoding section 108. A process carried out by the transmitting section 110*b* in this step is the same as that carried out by the transmitting section 110*b* described in connection with the configuration of the image processing apparatus 100*b* in accordance with the third example embodiment. Thus, a detailed description of the process is omitted.

(Description of Flow of Process in Display Apparatus)

Next, the flow of the process in the display apparatus 200*b* is described below step-by-step.

(Step S202*b*)

In the process in the display apparatus 200*b* in accordance with the third example embodiment, in the step S202*b*, the receiving section 202*b* receives the encoded data that has been transmitted from the transmitting section 110*b*. Since a process carried out by the receiving section 202*b* in this step is similar to the process described in connection with the display apparatus 200*b* of the third example embodiment, a detailed description is omitted here.

(Step S204*b*)

In the process in the display apparatus 200*b* in accordance with the third example embodiment, in the step S204*b*, the decoding section 204*b* decodes the encoded data received by the receiving section 202*b*, thereby converting the encoded data into image data. Since a process carried out by the decoding section 204*b* in this step is similar to the process described in connection with the display apparatus 200*b* of the third example embodiment, a detailed description is omitted here.

(Step S206*b*)

In the process in the display apparatus 200*b* in accordance with the third example embodiment, in the step S206*b*, the display section 206*b* displays the image on the basis of the image data obtained from the decoding section 204*b*. Since a process carried out by the display section 206*b* in this step is similar to the process described in connection with the display apparatus 200*b* of the third example embodiment, a detailed description is omitted here.

(Effects of Display Method in Image Display System)

As has been described, according to the display method in the image display system 10*b*, it is possible to specify, in accordance with a corresponding level of importance, roughness of an encoding process with respect to each of a plurality of regions included in a target image which has been captured from a movable body. In particular, in the example process S1060*a* of the third example embodiment, image data which has been obtained by capturing from a movable body and which has been encoded is suitably reduced. Therefore, according to the display method in the image display system 10*b*, it is possible to suitably suppress a transmission load. Moreover, in the example process S1060*b* of the third example embodiment, it is possible to suitably suppress a transmission load by suitably reducing image data which has been obtained by capturing from a movable body and which has been encoded, and possible to display an image of an important region with high quality.

Fourth Example Embodiment

The following description will discuss, in detail, a fourth example embodiment of the present invention with reference to drawings. The present example embodiment is one example embodiment of an image display system. An image display system 10*c* in accordance with the present example embodiment replaces at least one of a plurality of regions, which are included in an obtained data, with alternative data in accordance with levels of importance, and derives an evaluation value with reference to the replaced data. The image display system 10*c* in accordance with the present example embodiment is a system which trains a parameter estimating means with reference to the evaluation value. The image display system 10*c* in accordance with the present example embodiment is also a system which estimates the levels of importance with use of an importance level map that refers to a line of sight of a human.

(Configuration of Image Display System)

Figure 10:
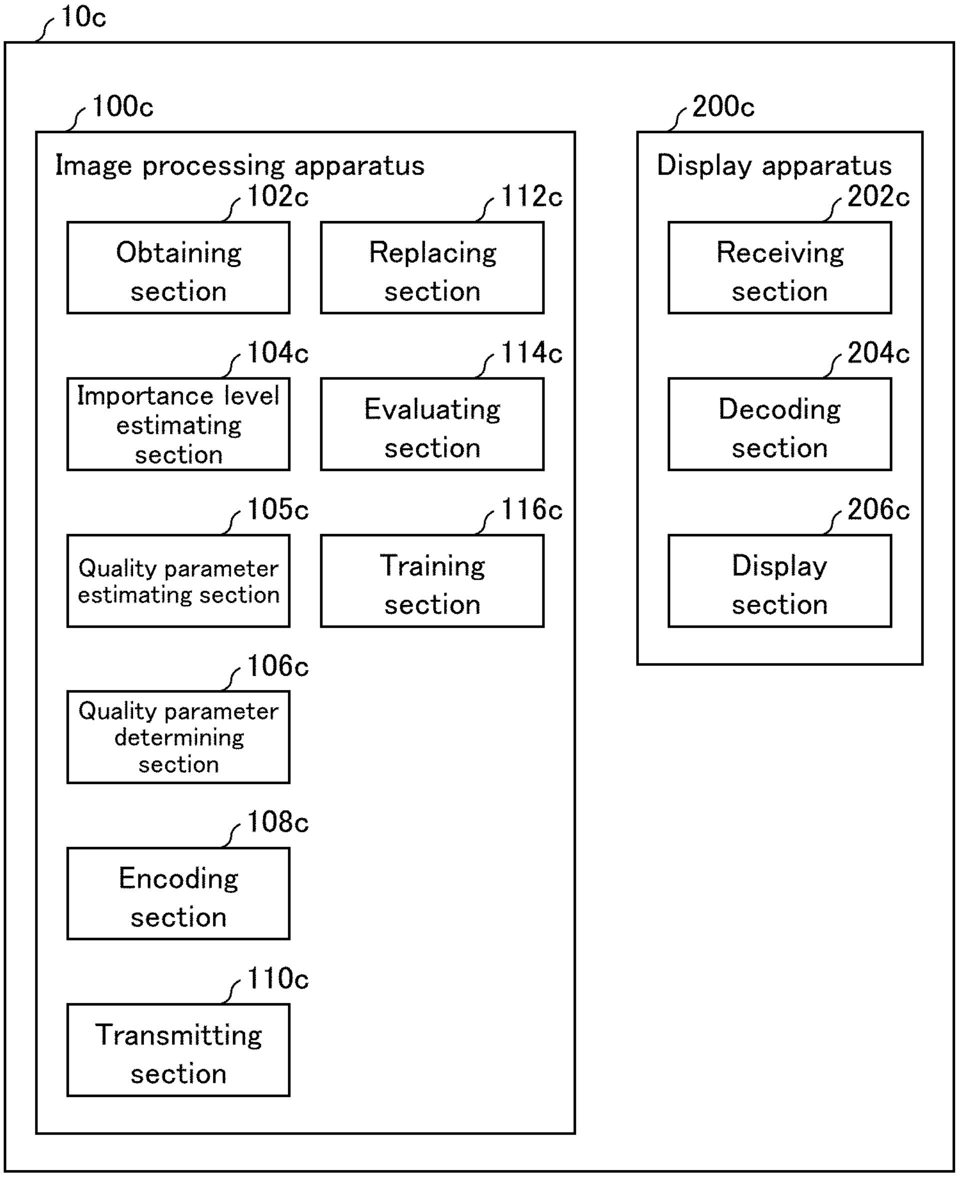
FIG. 10 is a block diagram illustrating a configuration of an image display system in accordance with a fourth example embodiment of the present invention.

A configuration of the image display system 10*c* in accordance with the fourth example embodiment is described with reference to FIG. 10. FIG. 10 is a block diagram illustrating the configuration of the image display system 10*c*. As illustrated in FIG. 10, the image display system 10*c* includes an image processing apparatus 100*c* and a display apparatus 200*c*.

(Configuration of Image Processing Apparatus)

The image processing apparatus 100*c* includes an obtaining section 102*c*, an importance level estimating section 104*c*, a quality parameter estimating section 105*c*, a quality parameter determining section 106*c*, an encoding section 108*c*, and a transmitting section 110*c*, a replacing section 112*c*, an evaluating section 114*c*, and a training section 116*c*, as illustrated in FIG. 5. Each of these sections is described below.

Note that the replacing section 112*c* is an embodiment of a replacing means recited in the claims. The evaluating section 114*c* is an embodiment of an evaluating means recited in the claims. The training section 116*c* is an embodiment of a training means recited in the claims.

(Obtaining Section)

The obtaining section 102*c* obtains an image. The image obtained by the obtaining section 102*b* is an image which has been captured from a movable body or the like. A configuration of the obtaining section 102*b* in accordance with the present example embodiment is similar to the configuration of the obtaining section 102*b* described in the third example embodiment. Thus, a detailed description thereof is omitted here.

(Importance Level Estimating Section)

The importance level estimating section 104*c* estimates levels of importance with respect to a respective plurality of regions included in the image which has been obtained by the obtaining section 102*c*. The importance level estimating section 104*c* may be configured to estimate the levels of importance with use of an importance level map that refers to a line of sight of a human.

Note, here, that how to generate the importance level map that refers to a line of sight of a human and how to refer to the map do not limit the present embodiment. However, as an example, it is possible to (i) detect, for a given time, a line of sight of a human who is viewing a target image, (ii) create a heat map in accordance with the detected line of sight, and (iii) use the heat map as the importance level map. More specifically, the importance level estimating section 104*c* can be configured to estimate that a region in the heat map on which region the line of sight is more concentrated is a region which has a higher level of importance.

A more detailed example process carried out by the importance level estimating section 104*c* in accordance with the present example embodiment is described later.

(Quality Parameter Estimating Section)

The quality parameter estimating section 105*c* estimates preliminary quality parameters with respect to a respective plurality of regions included in the image which has been obtained by the obtaining section 102*c*. A configuration of the quality parameter estimating section 105*c* in accordance with the present example embodiment is similar to the configuration of the quality parameter estimating section 105*b* described in the third example embodiment. Thus, a detailed description thereof is omitted here.

(Quality Parameter Determining Section)

The quality parameter determining section 106*c* determines quality parameters with respect to the respective plurality of regions with reference to the levels of importance and the estimated preliminary quality parameters. A configuration of the quality parameter determining section 106*c* in accordance with the present example embodiment is similar to the configuration of the quality parameter determining section 106*b* described in the third example embodiment. Thus, a detailed description thereof is omitted here.

(Encoding Section)

The encoding section 108*c* generates encoded data by encoding the target image with use of the quality parameters determined by the quality parameter determining section 106*c*. A configuration of the encoding section 108*c* in accordance with the present example embodiment is similar to the configuration of the encoding section 108*b* described in the third example embodiment. Thus, a detailed description thereof is omitted here.

(Transmitting Section)

The transmitting section 110*c* transmits the encoded data generated by the encoding section 108*c*. A configuration of the transmitting section 110*c* in accordance with the present example embodiment is similar to the configuration of the transmitting section 110*b* described in the third example embodiment. Thus, a detailed description thereof is omitted here.

(Replacing Section)

The replacing section 112*c* generates replaced data by replacing at least one of the plurality of regions, which are included in the image, with alternative data in accordance with the levels of importance. That is, the replacing section 112*c* generates the replaced data by replacing at least one of the plurality of regions, which are included in an image for training that has been obtained by the obtaining section 102*c*, with the alternative data in accordance with the levels of importance which have been estimated by the importance level estimating section 104*c*. A detailed example process carried out by the replacing section 112*c* is described later.

(Evaluating Section)

The evaluating section 114*c* derives an evaluation value by referring to the replaced data. That is, the evaluating section 114*c* derives the evaluation value by referring to the data which has been replaced by the replacing section 112*c*. Note, here, that, the evaluating section 114*c* may be configured to further refer to the image for training which has been obtained by the obtaining section 102*b* and which has not been replaced. A detailed example process carried out by the evaluating section 114*c* is described later.

(Training Section)

The training section 116*c* trains the importance level estimating section 104*c* with reference to the evaluation value. The training section 116*c* trains the importance level estimating section 104*b* with reference to the evaluation value which has been derived by the evaluating section 114*c*. Note, here, that training of the importance level estimating section 104*b* can be carried out by updating various parameters, which are possessed by an inference model that functions as the importance level estimating section 104*b*, in accordance with the evaluation value. A detailed example process carried out by the training section 116*c* is described later.

(Configuration of Display Apparatus)

The display apparatus 200*c* includes a receiving section 202*c*, a decoding section 204*c*, and a display section 206*c*. The function of the display apparatus 200*c* is basically the same as that of the display apparatus 200*b* of the third example embodiment. Therefore, a description is given below except for a part which overlaps with the description of the display apparatus 200*b* of the third example embodiment.

The receiving section 202*c* receives the encoded data that has been transmitted from the transmitting section 110*c*.

The decoding section 204*c* decodes the encoded data received by the receiving section 202*c*, thereby converting the encoded data into image data.

The display section 206*c* displays the image obtained after decoding by the decoding section 204*c*.

(Description of Process in Image Processing Apparatus)

As described above, the same descriptions of the same configurations as those in the third example embodiment are omitted. Processes carried out by the importance level estimating section 104*c*, the replacing section 112*c*, the evaluating section 114*c*, and the training section 116*c* in accordance with the present example embodiment are described with reference to FIGS. 11 and 12.

(Description of Processes Carried Out by Importance Level Estimating Section 104*c*, Replacing Section 112*c*, Evaluating Section 114*c*, and Training Section 116*c*)

Figure 11A:
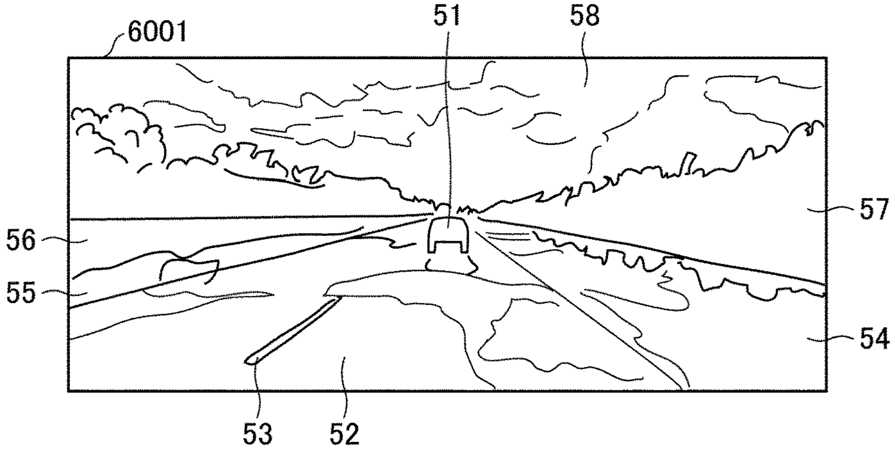
FIG. 11A illustrates a frame (image) of a video which has been obtained from an image capturing section of the image display system in accordance with the fourth example embodiment of the present invention.
Figure 11B:
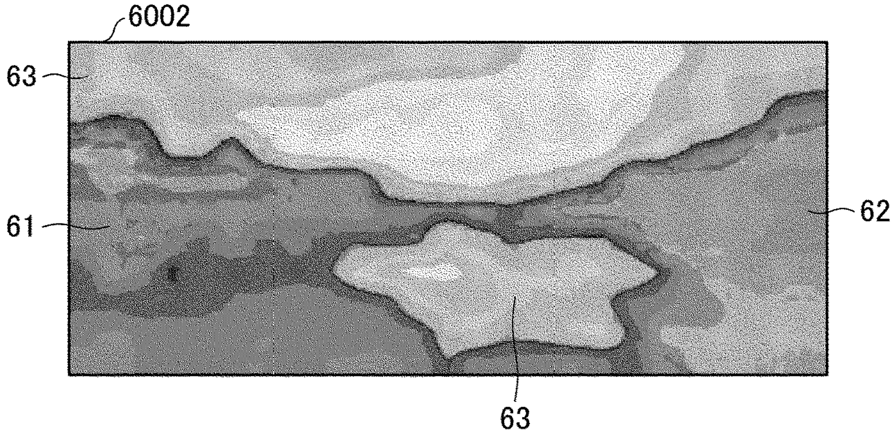
FIG. 11B illustrates a heat map which shows levels of importance that have been estimated in the image display system in accordance with the fourth example embodiment of the present invention.
Figure 11C:
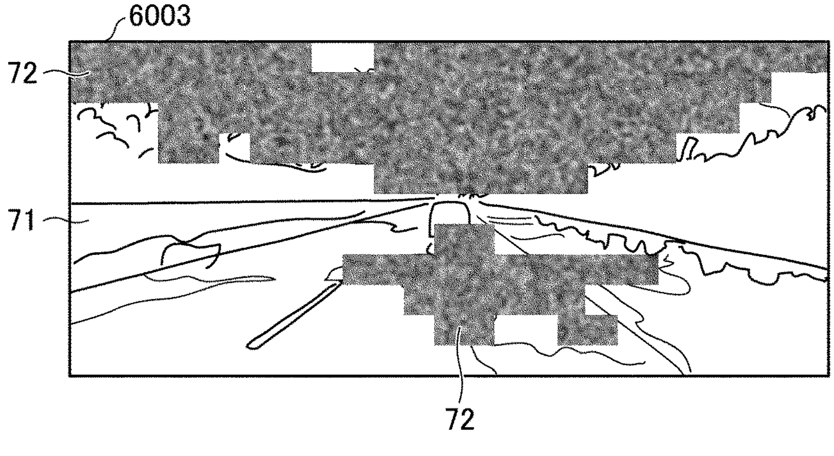
FIG. 11C illustrates that a region of the heat map which region has a low level of importance has been replaced with noise data in the image display system in accordance with the fourth example embodiment of the present invention.

FIG. 11 illustrates (i) an image which has been obtained by an image capturing section of a movable body or the like and (ii) a step of replacing, with noise, a part of regions of the image. 6001 of FIG. 11 is a frame (image) of a video which has been obtained from the image capturing section. The frame 6001 shows a car 51 which travels ahead, a road 52, a center line 53, sidewalks 54 and 55, a field 56 which is located next to the sidewalk 55, a background 57, the sky 58, and the like.

The importance level estimating section 104*c* estimates levels of importance (necessity for monitoring) of respective regions in the image 6001 of the frame. 6002 of FIG. 11 is a heat map which shows the levels of importance that have been estimated by the importance level estimating section 104*c*. An actual heat map shows the levels of importance in colors. However, for convenience, the heat map 6002 shows the levels of importance with use of levels of shading, and a darker region has a higher level of importance. A region 61 of the heat map 6002 includes the car 51, the road 52 which includes the center line 53, the sidewalk 55, the field 56 which is located next to the sidewalk, and the like. Thus, it can be seen that the region 61 has a high level of importance. A region 62 includes the sidewalk 54 which is located on a traveling lane side, a part of the background 57, and the like. Thus, it can be seen that the region 62 has a high level of importance. A region 63 includes the sky and the road on which the car is not traveling. Thus, it can be seen that the region 63 has a relatively low level of importance as compared with the regions 61 and 62.

As an example, the importance level estimating section 104*c* estimates the levels of importance with use of a Self-Attention algorithm. The Self-Attention algorithm is a known algorithm in which attention is paid to in-process calculation results of itself and data to be read is determined based on the calculation results. A function generated by the Self-Attention algorithm includes a parameter for weighting. Note that a method of training the importance level estimating section 104*c* is described later.

The replacing section 112*c* replaces, with alternative data, data of one or more regions in the image 6001 which have low levels of importance. Specifically, the replacing section 33 replaces, with the alternative data, one or more regions which have been selected in ascending order of the levels of importance and which have a given proportion in the frame. The alternative data is data which has a data volume (data size) that is reduced as compared with that of the original data. The replaced image 6003 of FIG. 11 includes a region 72 that is obtained by replacing, with noise data, the region 63 which is in the heat map 6002 and which has a low level of importance. A data size of the noise data is smaller than that of the original image data. A region 71 is a region of high importance. Therefore, the region 71 is a region which has not been replaced with the noise data.

Figure 12A:
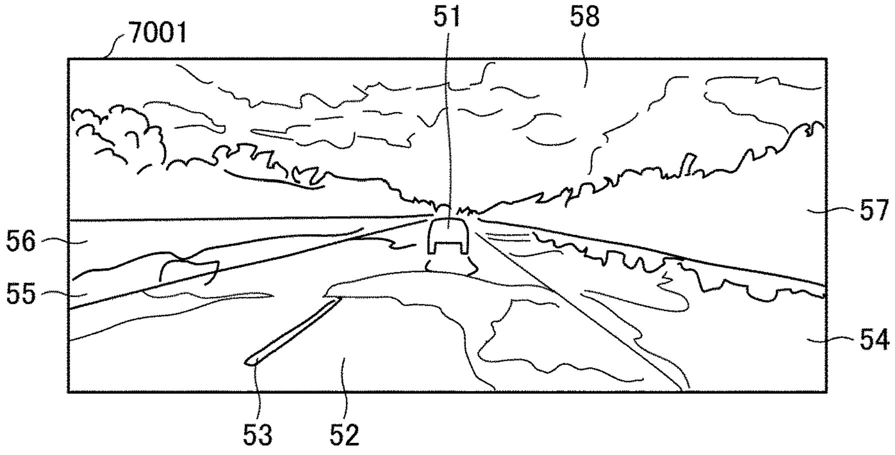
FIG. 12A illustrates a frame (image) of a video which has been obtained from the image capturing section of the image display system in accordance with the fourth example embodiment of the present invention.
Figure 12B:
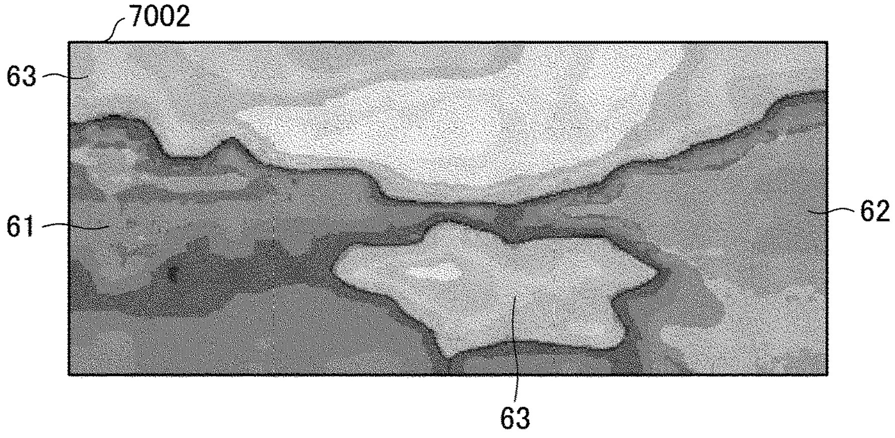
FIG. 12B illustrates a heat map which shows levels of importance that have been estimated in the image display system in accordance with the fourth example embodiment of the present invention.
Figure 12C:
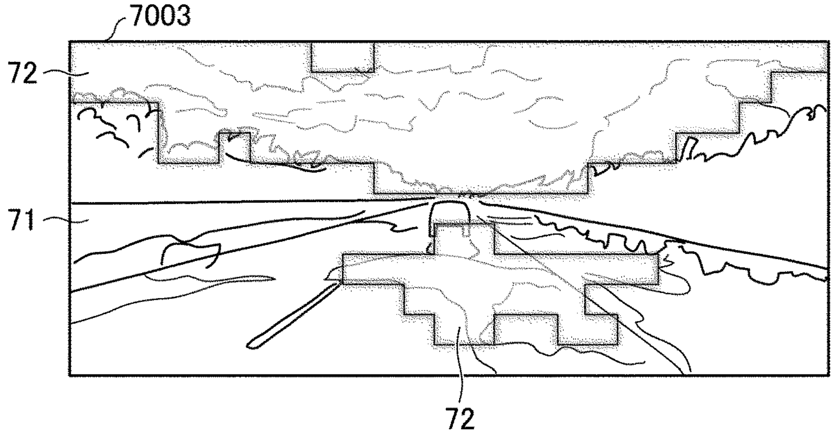
FIG. 12C illustrates that a region of the heat map which region has a low level of importance has been replaced with image data which has a large quantization error, in the image display system in accordance with the fourth example embodiment of the present invention.

The replacing section 112*c* may replace, with data other than noise, e.g., image data that has a large quantization error, the data of the one or more regions that have low levels of importance. That is, the alternative data used by the replacing section 112*c* is data which includes at least one of the noise and the image data that has a large quantization error. FIG. 12 illustrates that data of one or more regions which are included in the image illustrated in FIG. 11 and which have low levels of importance is replaced with the image data that has a large quantization error, by setting a quantum parameter large. An image 7001 and a heat map 7002 of FIG. 12 are the same as the image 6001 and the heat map 6002, respectively, of FIG. 11. An image 7003 is an image obtained by replacing the region 63, which has a low level of importance, with the image data that has a large quantization error. By setting the quantum parameter large, it is possible to reduce data size.

The evaluating section 114*c* derives an evaluation value for a case where the replaced image 6003 or the replaced image 7003 is used. The replaced image 6003 or the replaced image 7003 is an image of which a part is the noise or the image which has a large quantization error. In a case where such a replaced image does not affect safe traveling of a self-driving vehicle, a high evaluation value is given to the replaced image. A detailed example of the evaluating section 114*c* is described later.

The training section 116*c* trains the importance level estimating section 104*c* with reference to the evaluation value derived by the evaluating section 114*c*. A detailed example of a training method carried out by the training section 116*c* is described below in detail.

Detailed Example of Training Method

Figure 13:
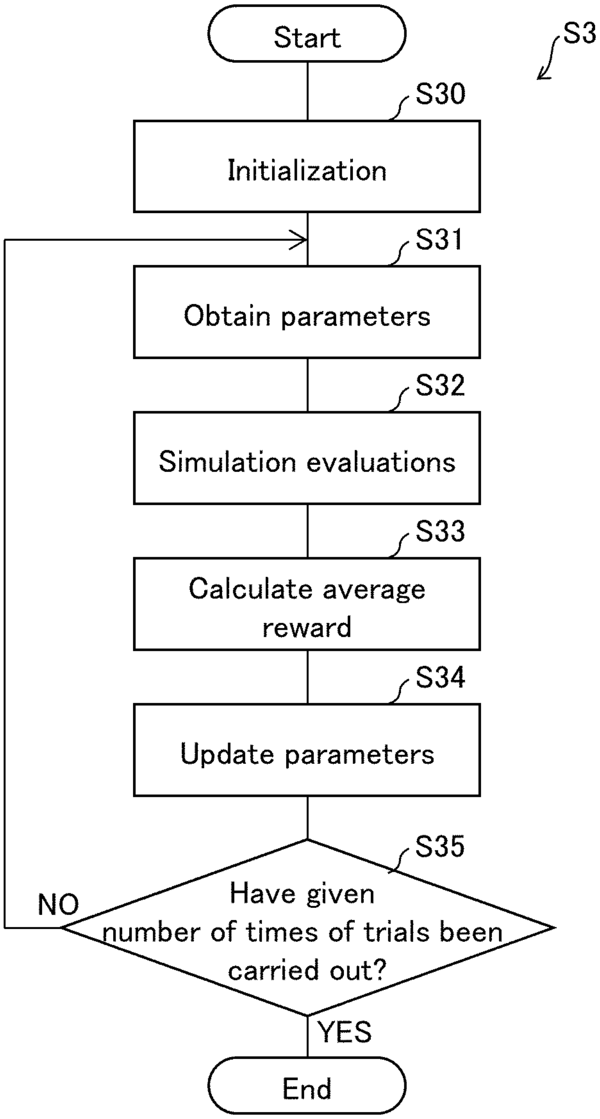
FIG. 13 is a flowchart illustrating an example of a flow of a training method which is carried out by an image display system in accordance with the fourth example embodiment of the present invention and which is a method of training a method of estimating levels of importance of data.

Next, a method S3 of training the importance level estimating section 104*c* which includes the Self-Attention algorithm is described with reference to a drawing. FIG. 13 is a flowchart illustrating an example of a flow of the training method S3 of training the importance level estimating section 104*c*. The training method S3 is a method of training the importance level estimating section 104*c* with use of a simulated video that is used in the Self-Attention algorithm.

First, in a step S30, the image processing apparatus 100*c* initializes data of the Self-Attention algorithm.

Next, in a step S31, the image processing apparatus 100*c* obtains parameters of the Self-Attention algorithm. The parameters obtained in the first simulation are parameters which have been arbitrarily set and inputted by a user.

Next, in a step S32, the image processing apparatus 100*c* carries out simulations, and evaluates the simulations. In the present embodiment, each of the simulations carried out is a simulation of autonomous operation. The image processing apparatus 100*c* derives a reward value from a result of each of the simulations. A detailed flow of the above simulation evaluations is described later with reference to another drawing.

Next, in a step S33, the image processing apparatus 100*c* calculates an average reward. The average reward is an average value of reward values which are, as evaluation values, repeatedly derived a given number of times in the simulation evaluations described later. Specifically, in the simulation evaluations, a series of simulation steps are repeatedly carried out the given number of times as described later. In so doing, the reward values derived in the respective simulation steps are accumulated. Then, a value obtained by dividing a final cumulative value of the reward values by the given number of times is the average value of the reward values.

Next, in a step S34, the image processing apparatus 100*c* updates the parameters of the Self-Attention algorithm. Specifically, the training section 116*c* updates the parameters, on the basis of the average value of the reward values which has been derived in the step S33, so that the average value of the reward values becomes higher.

Next, in a step S35, the image processing apparatus 100*c* determines whether or not the given number of times of trials of the simulation evaluations have been carried out. In a case where it is determined, in the step S35, that the given number of times of trials of the simulation evaluations have been carried out (step S35: YES), the training flow is ended. On the other hand, in a case where it is determined that the given number of times of trials of the simulation evaluations have not been carried out (step S35: NO), the flow returns to the step S31. In the step S31, a control section 30 obtains the parameters updated in the step S34.

Figure 14:
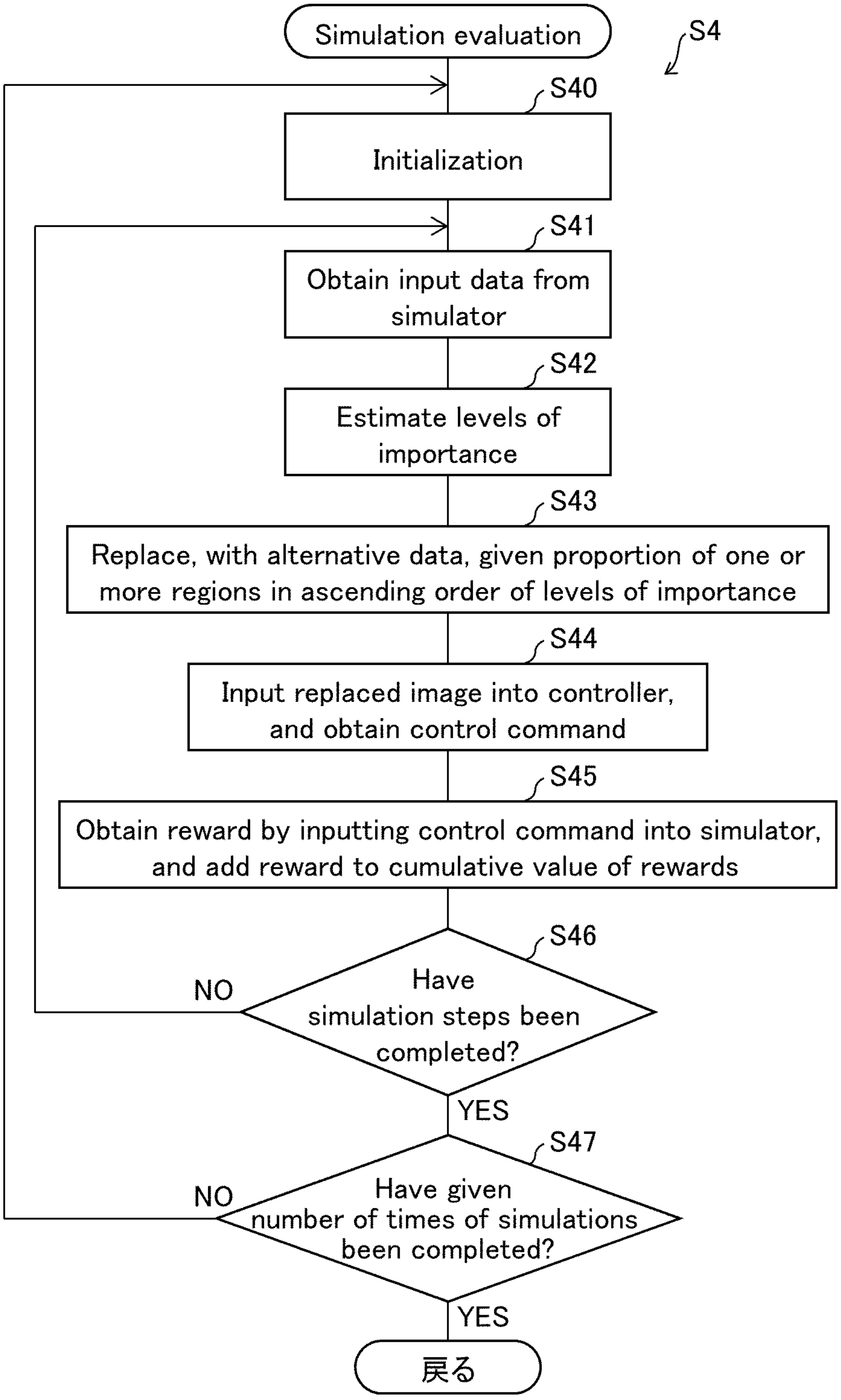
FIG. 14 is a flowchart of a simulation evaluating step illustrated in FIG. 13.

Next, a detailed flow of the simulation evaluating step in the step S32 is described with reference to a drawing. FIG. 14 is a flowchart of a simulation evaluating method S4. In the present example embodiment, the simulation evaluations are carried out with use of an autonomous operation simulator. The autonomous operation simulator is an apparatus which simulates, on a computer, autonomous operation carried out by an autonomous operation controller, on the basis of a video that simulates a video obtained by an in-vehicle camera. As the autonomous operation simulator, open source CARLA can be, for example, used.

First, in a step S40, the image processing apparatus 100*c* initializes data of the autonomous operation simulator.

Next, in a step S41, the image processing apparatus 100*c* obtains input data from the autonomous operation simulator. Specifically, the obtaining section 102*c* obtains, as the input data, simulated video data from the autonomous operation simulator, and transmits the simulated video data to the importance level estimating section 104*c*.

Next, in a step S42, the image processing apparatus 100*c* estimates levels of importance of the obtained input data. Specifically, the importance level estimating section 104*c* divides, into a plurality of regions, frame data that is included in the video data, and estimates the levels of importance with respect to the respective plurality of regions with use of the Self-Attention algorithm.

Next, in a step S43, the image processing apparatus 100*c* replaces, with alternative data, a given proportion of one or more regions in ascending order of the levels of importance. Specifically, it is assumed that the given proportion is set to, for example, 40%. In this case, the image processing apparatus 100*c* selects one or more regions in ascending order of the levels of importance. In a case where the total data size of the selected one or more regions (or the total image area of the selected one or more regions) reaches 40% or more of all the regions, the image processing apparatus 100*c* stops the selection. Then, the image processing apparatus 100*c* replaces all the selected one or more regions with the alternative data.

Next, in a step S44, the image processing apparatus 100*c* inputs a replaced image into the autonomous operation controller, and obtains a control command outputted by the autonomous operation controller.

Next, in a step S45, the image processing apparatus 100*c* obtains a reward by inputting the control command into the autonomous operation simulator, and adds the reward to a cumulative value of rewards. Accumulation of rewards means, for example, adding a reward value in the n-th (n is an integer of 2 or more) simulation step to the sum of reward values in the first to the n−1-th simulation steps. That is, a cumulative value of reward values in up to the n-th simulation steps is calculated by adding the reward value in the n-th simulation step to the sum of the reward values in the first to the n−1-th simulation steps.

In a case where an operation result from the autonomous operation simulator into which the control command has been inputted indicates safe operation, a high reward value is given. In contrast, a low reward value is given in a case where the operation result from the autonomous operation simulator indicates operation of which safety is threatened. Whether or not the operation result indicates safe operation may be considered with a focus on the presence or absence of an accident.

Next, in a step S46, the image processing apparatus 100*c* determines whether or not all simulation steps have been completed. That is, the image processing apparatus 100*c* determines whether or not all simulated videos possessed by the autonomous operation simulator have been subjected to the above replacing process and inputted into the controller. In a case where it is determined in the step S46 that all the simulation steps have been completed or that an accident has occurred (step S46: YES), the flow proceeds to a step S47. In a case where it is determined in the step S46 that all the simulation steps have not been completed (step S46: NO), the flow returns to the step S41.

In the step S47, the image processing apparatus 100*c* determines whether or not a given number of times of simulations have been completed. The given number of times is, for example, a number of times that is sufficient to calculate an average reward. In a case where it is determined in the step S47 that the given number of times of simulations have been completed (step S47: YES), the simulation evaluating step is ended, and the flow proceeds to the step S33 in FIG. 13. In a case where it is determined in the step S47 that the given number of times of simulations have not been completed (step S47: NO), the flow returns to the step S40.

(Effects of Image Display System)

According to the image display system 10*c* configured as described above, the image processing apparatus 100*c* (i) replaces at least one of a plurality of regions, which are included in a target image that has been captured from a movable body, with alternative data in accordance with levels of importance, (ii) derives an evaluation value with reference to replaced data, and (iii) trains the parameter estimating means with reference to the evaluation value.

Therefore, according to the image display system 10*c*, it is possible to suitably train the importance level estimating section 104*c*. Thus, it is possible for the importance level estimating section 104*c* to suitably estimate the levels of importance.

With this configuration, according to the image display system 10*c*, encoded data is generated with use of quality parameters which have been determined in accordance with the suitably estimated levels of importance. Therefore, it is possible to suitably suppress a transmission load while maintaining the quality of an important region.

Software Implementation Example

A part or all of the functions of each of the image processing apparatus 100 and the image display systems

10*a*, 10*b*, and 10*c* may be realized by hardware such as an integrated circuit (IC chip) or may be alternatively realized by software.

Figure 15:
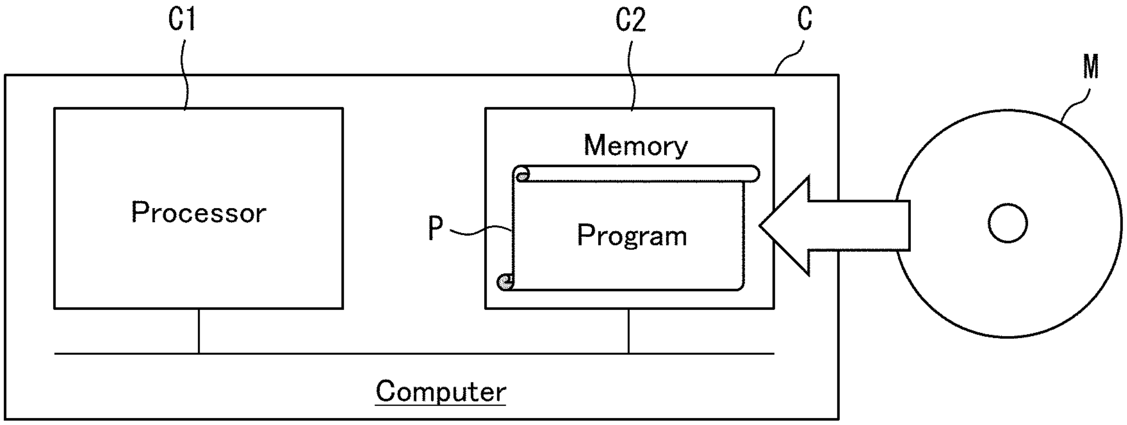
FIG. 15 is a block diagram illustrating an example hardware configuration of each of information processing apparatuses in accordance with the example embodiments of the present invention.

In the latter case, the image processing apparatus 100 and the image display systems 10*a*, 10*b*, and 10*c* are each realized by, for example, a computer that executes instructions of a program that is software realizing the functions. FIG. 15 illustrates an example of such a computer (hereinafter, referred to as "computer C"). The computer C includes at least one processor C1 and at least one memory C2. In the memory C2, a program P for causing the computer C to operate as each of the image processing apparatuses 100, 100*a*, 100*b*, and 100*c* is recorded. In the computer C, the functions of each of the image processing apparatus 100 and the image display systems 10*a*, 10*b*, 10*c* are realized by the processor C1 reading the program P from the memory C2 and executing the program P.

The processor C1 can be, for example, a central processing unit (CPU), a graphic processing unit (GPU), a digital signal processor (DSP), a micro processing unit (MPU), a floating point number processing unit (FPU), a physics processing unit (PPU), a microcontroller, or a combination thereof. The memory C2 can be, for example, a flash memory, a hard disk drive (HDD), a solid state drive (SSD), or a combination thereof.

Note that the computer C may further include a random access memory (RAM) in which the program P is loaded when executed and/or in which various kinds of data are temporarily stored. The computer C may further include a communication interface via which the computer C transmits and receives data to and from another apparatus. The computer C may further include an input/output interface via which the computer C is connected to an input/output apparatus such as a keyboard, a mouse, a display, and a printer.

The program P can also be recorded in a non-transitory tangible recording medium M from which the computer C can read the program P. Such a recording medium M can be, for example, a tape, a disk, a card, a semiconductor memory, a programmable logic circuit, or the like. The computer C can acquire the program P via such a recording medium M. The program P can also be transmitted via a transmission medium. Such a transmission medium can be, for example, a communication network, a broadcast wave, or the like. The computer C can acquire the program P via such a transmission medium.

Additional Remark 1

The present invention is not limited to the foregoing example embodiments, but may be altered in various ways by a skilled person within the scope of the claims. For example, the present invention also encompasses, in its technical scope, any example embodiment derived by appropriately combining technical means disclosed in the foregoing example embodiments.

Additional Remark 2

The whole or part of the example embodiments disclosed above can be described as follows. Note, however, that the present invention is not limited to the following example aspects.

An image processing apparatus in accordance with a first aspect incudes: an obtaining means for obtaining an image which has been captured from a movable body; an importance level estimating means for estimating levels of importance with respect to a respective plurality of regions included in the image; a quality parameter estimating means for estimating preliminary quality parameters with respect to the respective plurality of regions included in the image; and a quality parameter determining means for determining quality parameters with respect to the respective plurality of regions with reference to the preliminary quality parameters which have been estimated and the levels of importance.

According to the above configuration, it is possible to suitably reduce the data volume of a target image which has been captured from a movable body.

The image processing apparatus in accordance with a second aspect employs a configuration such that, in the configuration of the first aspect, the quality parameter estimating means estimates the preliminary quality parameters so that encoding efficiency in a case where the image is encoded is improved.

According to the above configuration, it is possible to determine suitable quality parameters.

The image processing apparatus in accordance with a third aspect employs a configuration such that, in the configuration of the first or second aspect, the importance level estimating means classifies the plurality of regions into an important region which has been estimated to have a high level of importance and a non-important region other than the important region, in accordance with the levels of importance which have been estimated; and in the important region, the quality parameter determining means determines a preliminary quality parameter as a quality parameter, and in the non-important region, the quality parameter determining means determines, as a quality parameter, a parameter which corresponds to quality lower than quality indicated by a preliminary quality parameter.

According to the above configuration, it is possible to suitably reduce the data volume of a target image in accordance with levels of importance.

The image processing apparatus in accordance with a fourth aspect employs a configuration such that, in the configuration of the first or second aspect, the importance level estimating means classifies the plurality of regions into an important region which has been estimated to have a high level of importance and a non-important region other than the important region, in accordance with the levels of importance which have been estimated; and in the important region, the quality parameter determining means determines, as a quality parameter, a parameter which corresponds to quality higher than quality indicated by a preliminary quality parameter, and in the non-important region, the quality parameter determining means determines, as a quality parameter, a parameter which corresponds to quality lower than quality indicated by a preliminary quality parameter.

According to the above configuration, it is possible to suitably reduce the data volume of a target image while improving the quality of a region which has a relatively high level of importance.

The image processing apparatus in accordance with a fifth aspect employs a configuration such that, in the configuration of any one of the first through fourth aspects, the importance level estimating means estimates the levels of importance with respect to the respective plurality of regions included in the image, with use of a trained model which has been trained with use of the image that has been captured from the movable body.

According to the above configuration, it is possible to suitably estimate levels of importance.

The image processing apparatus in accordance with a sixth aspect employs a configuration such that, in the configuration of any one of the first through fifth aspects, the image processing apparatus further includes an encoding means for encoding the image with use of the quality parameters which have been determined by the determining means.

According to the above configuration, it is possible to suitably generate encoded data of which the data volume is reduced.

The image processing apparatus in accordance with a seventh aspect employs a configuration such that, in the configuration of any one of the first through sixth aspects, the image processing apparatus further includes: a replacing means for generating replaced data by replacing at least one of the plurality of regions, which are included in the image, with alternative data in accordance with the levels of importance; an evaluating means for deriving an evaluation value by referring to the replaced data; and a training means for training the importance level estimating means with reference to the evaluation value.

According to the above configuration, it is possible to suitably train the importance level estimating means.

The image processing apparatus in accordance with an eighth aspect employs a configuration such that, in the configuration of the seventh aspect, the evaluating means derives the evaluation value by further referring to the image which has been obtained by the obtaining means.

According to the above configuration, it is possible to suitably train the importance level estimating means.

The image processing apparatus in accordance with a ninth aspect employs a configuration such that, in the configuration of any one of the first through eighth aspects, the importance level estimating means estimates the levels of importance with use of an importance level map which refers to a line of sight of a human.

According to the above configuration, it is possible to suitably estimate levels of importance.

An image display system in accordance with a tenth aspect includes: an obtaining means for obtaining an image which has been captured from a movable body; an importance level estimating means for estimating levels of importance with respect to a respective plurality of regions included in the image; a quality parameter estimating means for estimating preliminary quality parameters with respect to the respective plurality of regions included in the image; a quality parameter determining means for determining quality parameters with respect to the respective plurality of regions with reference to the preliminary quality parameters which have been estimated and the levels of importance; a transmitting means for transmitting encoded data which has been encoded with use of the quality parameters that have been determined by the quality parameter determining means; a receiving means for receiving the encoded data; and a display means for displaying the image which is obtained by decoding the encoded data that has been received by the receiving means.

According to the above configuration, it is possible to bring about an effect similar to that brought about by the first aspect.

An image processing method in accordance with an eleventh aspect employs a method including: obtaining an image which has been captured from a movable body; estimating levels of importance with respect to a respective plurality of regions included in the image; estimating preliminary quality parameters with respect to the respective plurality of regions included in the image; and determining quality parameters with respect to the respective plurality of regions with reference to the preliminary quality parameters which have been estimated and the levels of importance.

According to the above method, it is possible to bring about an effect similar to that brought about by the first aspect.

A recording medium in accordance with a twelfth aspect employs a configuration such that the recording medium is a recording medium in which a program for causing a computer to function as an information processing apparatus is stored, the program causing the computer to function as: an obtaining means for obtaining an image which has been captured from a movable body; an importance level estimating means for estimating levels of importance with respect to a respective plurality of regions included in the image; a quality parameter estimating means for estimating preliminary quality parameters with respect to the respective plurality of regions included in the image; and a quality parameter determining means for determining quality parameters with respect to the respective plurality of regions with reference to the preliminary quality parameters which have been estimated and the levels of importance.

According to the above method, it is possible to bring about an effect similar to that brought about by the first aspect.

A program in accordance with a thirteenth aspect employs a configuration such that the program is a program for causing a computer to function as an information processing apparatus, the program causing the computer to function as: an obtaining means for obtaining an image which has been captured from a movable body; an importance level estimating means for estimating levels of importance with respect to a respective plurality of regions included in the image; a quality parameter estimating means for estimating preliminary quality parameters with respect to the respective plurality of regions included in the image; and a quality parameter determining means for determining quality parameters with respect to the respective plurality of regions with reference to the preliminary quality parameters which have been estimated and the levels of importance.

According to the above method, it is possible to bring about an effect similar to that brought about by the first aspect.

Additional Remark 3

The whole or part of the example embodiments disclosed above can also be expressed as follows.

An image processing apparatus including at least one processor, the at least one processor carrying out: an obtaining process of obtaining an image which has been captured from a movable body; an importance level estimating process of estimating levels of importance with respect to a respective plurality of regions included in the image; a quality parameter estimating process of estimating preliminary quality parameters with respect to the respective plurality of regions included in the image; and a quality parameter determining process of determining quality parameters with respect to the respective plurality of regions with reference to the preliminary quality parameters which have been estimated and the levels of importance.

Note that this image processing apparatus may further include a memory, and, in this memory, a program may be stored which is for causing the at least one processor to carry out the obtaining process, the importance level estimating process, and the quality parameter determining process.

Alternatively, this program may be recorded in a computer-readable non-transitory tangible recording medium.

REFERENCE SIGNS LIST

10*a*, 10*b*, 10*c* Image display system
100, 100*a*, 100*b*, 100*c* Image processing apparatus
102, 102*b*, 102*c* Obtaining section
104, 104*b*, 104*c* Importance level estimating section
105*b*, 105*c* Quality parameter estimating section
106, 106*b*, 106*c* Importance level estimating section
108*b*, 108*c* Encoding section
110, 110*b*, 110*c* Obtaining section
112*c* Replacing section
114*c* Evaluating section
116*c* Training section
200*a*, 200*b*, 200*c* Display apparatus
202, 202*b*, 202*c* Receiving section
204*b*, 204*c* Receiving section
206, 206*b*, 206*c* Display section
300*b* Movable body
302*b* Image capturing section
304*b* Communication section

What is claimed is:

1. An image processing apparatus comprising:

at least one processor, the at least one processor being configured to carry out:

an obtaining process comprising obtaining an image which has been captured from a movable body;

an importance level estimating process comprising estimating levels of importance with respect to a respective plurality of regions included in the image;

a quality parameter estimating process comprising estimating preliminary quality parameters with respect to the respective plurality of regions included in the image; and a quality parameter determining process comprising determining quality parameters with respect to the respective plurality of regions with reference to the preliminary quality parameters which have been estimated and the levels of importance, wherein the importance level estimating process is carried out by an importance level estimating model which has been trained, and wherein the at least one processor is further configured to carry out:

a replacing process comprising generating replaced data by replacing at least one of the plurality of regions, which are included in the image, with alternative data in accordance with the levels of importance;

an evaluating process comprising deriving an evaluation value by referring to the replaced data; and a training process comprising training the importance level estimating model with reference to the evaluation value.

2. The image processing apparatus as set forth in claim 1, wherein in the evaluating process, the at least one processor derives the evaluation value by further referring to the image which has been obtained in the obtaining process.

3. An image processing method comprising:

obtaining an image which has been captured from a movable body;

estimating levels of importance with respect to a respective plurality of regions included in the image by an importance level estimating model which has been trained;

estimating preliminary quality parameters with respect to the respective plurality of regions included in the image;

determining quality parameters with respect to the respective plurality of regions with reference to the preliminary quality parameters which have been estimated and the levels of importance;

generating replaced data by replacing at least one of the plurality of regions, which are included in the image, with alternative data in accordance with the levels of importance;

deriving an evaluation value by referring to the replaced data; and training the importance level estimating model with reference to the evaluation value.

4. A non-transitory recording medium in which a program for causing a computer to function as an information processing apparatus is stored, the program causing the computer to execute operations comprising:

an obtaining process comprising obtaining an image which has been captured from a movable body;

an importance level estimating process comprising estimating levels of importance with respect to a respective plurality of regions included in the image by an importance level estimating model which has been trained;

a quality parameter estimating process comprising estimating preliminary quality parameters with respect to the respective plurality of regions included in the image;

a quality parameter determining process comprising determining quality parameters with respect to the respective plurality of regions with reference to the preliminary quality parameters which have been estimated and the levels of importance;

a replacing process comprising generating replaced data by replacing at least one of the plurality of regions, which are included in the image, with alternative data in accordance with the levels of importance;

an evaluating process comprising deriving an evaluation value by referring to the replaced data; and a training process comprising training the importance level estimating model with reference to the evaluation value.

* * * * *